United States Patent [19]

Szabo et al.

[11] 4,215,922

[45] Aug. 5, 1980

[54] METHOD FOR PROJECTING CHARACTERS AT A SELECTED POINT SIZE IN A PHOTOCOMPOSITION MACHINE

[75] Inventors: Francis S. Szabo, Morristown; George G. Pick, Mendham, both of N.J.

[73] Assignee: AM International, Inc., Los Angeles, Calif.

[21] Appl. No.: 956,682

[22] Filed: Nov. 1, 1978

Related U.S. Application Data

[60] Division of Ser. No. 830,129, Sep. 2, 1977, Pat. No. 4,135,794, which is a continuation of Ser. No. 576,382, May 12, 1975, abandoned.

[51] Int. Cl.[3] .......................... B41B 15/00; G03B 3/00

[52] U.S. Cl. .......................................... 354/5; 354/197

[58] Field of Search ...................................... 354/5–17, 354/25, 197; 355/55–63

[56] References Cited

U.S. PATENT DOCUMENTS

| | | | |
|---|---|---|---|
| 2,655,834 | 10/1953 | Pennington | 355/55 |
| 3,118,354 | 1/1964 | O'Brien | 354/5 |
| 3,122,075 | 2/1964 | Klyce et al. | 354/5 |
| 3,218,945 | 11/1965 | O'Brien et al. | 354/5 |
| 3,422,736 | 1/1969 | Moyroud et al. | 354/5 |
| 3,434,402 | 3/1969 | McCall | 354/5 |
| 3,539,256 | 11/1970 | Ables | 355/53 |
| 3,672,757 | 6/1972 | Szymber et al. | 353/101 |
| 3,728,019 | 4/1973 | Swing | 355/56 |
| 3,779,642 | 12/1973 | Ogawa et al. | 355/55 |
| 3,832,058 | 8/1974 | Gusovius | 355/56 |
| 3,843,254 | 10/1974 | Pramstraller et al. | 355/56 |
| 3,909,832 | 9/1975 | Booth | 354/5 |
| 3,918,067 | 11/1975 | Booth | 354/5 |
| 3,967,177 | 6/1976 | Scholten et al. | 354/10 |
| 3,968,501 | 7/1976 | Gilbert | 354/7 |
| 4,008,480 | 2/1977 | Szabo | 354/5 |
| 4,040,065 | 8/1977 | Booth | 354/5 |

*Primary Examiner*—Michael L. Gellner
*Attorney, Agent, or Firm*—A. W. Karambelas; R. S. Hulse

[57] ABSTRACT

In a photocomposition machine, a method for projecting characters at a selected point size. A first reference position and a second reference position are defined. The variator lens and the collimator lens of the machine are driven to the first and second reference positions, respectively, in predetermined directions. The variator lens is then driven from the first reference position to a first composing position, and the collimator lens is driven from the second reference position to a second composing position. The composing positions are determined by the point size data, and each lens is moved to a composition position only in a direction opposite the predetermined direction.

5 Claims, 20 Drawing Figures

13
13
82
71
72
78
79
80
83
84
85
86
87
89
96
98
70
73
81

METHOD FOR PROJECTING CHARACTERS AT A SELECTED POINT SIZE IN A PHOTOCOMPOSITION MACHINE

This is a division of application Ser. No. 830,129 filed Sept. 2, 1977, now U.S. Pat. No. 4,135,794 which is a continuation of application Ser. No. 576,382 filed May 12, 1975, now abandoned.

BACKGROUND OF THE INVENTION

The present invention is generally related to phototype-setting and more particularly to an improved photocomposition machine which is convenient to operate in an error-free manner and with a minimum amount of operator training.

Over the years, many photocomposition machines have been proposed or manufactured. The earliest machines were an adaptation of the hot metal line casting, in which the metal casting was replaced by individual photographic character elements. Later machines used photomechanical and electronic methods to select, expose, and space the characters on a photographic film or paper. Some of these machines took the form of manual typewriters with permutation bars to generate width codes for the various characters via a mechanical memory coupled to control circuitry and counters. In these machines, the photographic unit included a continuously rotating disc, flash lamp and stepping film carriage for leading. These earlier systems in which the keyboard interfaced directly with the machine, required the skilled operators to compose copy in justified lines.

With the introduction of computer technology, machines were later introduced which provided justification by way of computer controller. Highly complex machines were developed which could accommodate input from several operators. Such machines also have the capability of handling several thousand characters per second and providing automatic hyphenation and line justification. Typically with such machines, the operator types on the keyboard which develops a punched tape which is read and the information therefrom stored in a memory for appropriate processing under the control of a computer program.

While these sophisticated machines provide many automatic functions, they are very costly to manufacture and still require considerable training to operate. Thus, the total cost of installing such photocomposition machines is often beyond the financial means of the smaller printing operations.

SUMMARY OF THE INVENTION

The present invention provides an improved photocomposition machine which is relatively inexpensive to manufacture and which may be operated proficiently with a minimum amount of training. The features of the machine allow the operator to initiate point size and font value changes within a type line through convenient keyboard entries. Changes in point size are recognized by the lens system control, which provides signals for moving variator and collimator lens carriages to new locations for the desired magnification. This is carried out without the manual changing of lens, or the like, as was necessary with many conventional machines.

It is an object of this invention, to provide a mechanical carriage system for the lenses which operate in a highly precision routine, using standard mechanical members of moderate precision and subject to wear changes.

It is a further object of the present invention to provide a versatile photocomposition machine including a variable magnification lens system which is controlled in accordance with point size values selected by the operator.

Another object of this invention is to provide a unique lens system operated by a mechanical drive, and including control means which recalibrate for mechanical tolerances and wear variations each time the machine is started or reset by sending the lens carriage to a fixed starting position to actuate a position switch and thereby provide a control signal from which a selected starting point size value may be determined in motor steps.

A further object of this invention is to select a row of font characters to be projected from a multi-row font by shifting the font relative to a fixed projection optical axis.

IN THE DRAWINGS

FIG. *5b* is a simplified perspective view of the variator/collimator lens and escapement system of the present invention.

FIG. *6a* is a block diagram of a first portion of the keyboard interface board.

FIG. *6b* is a block diagram of a second portion of the keyboard interface board.

Figure 7:
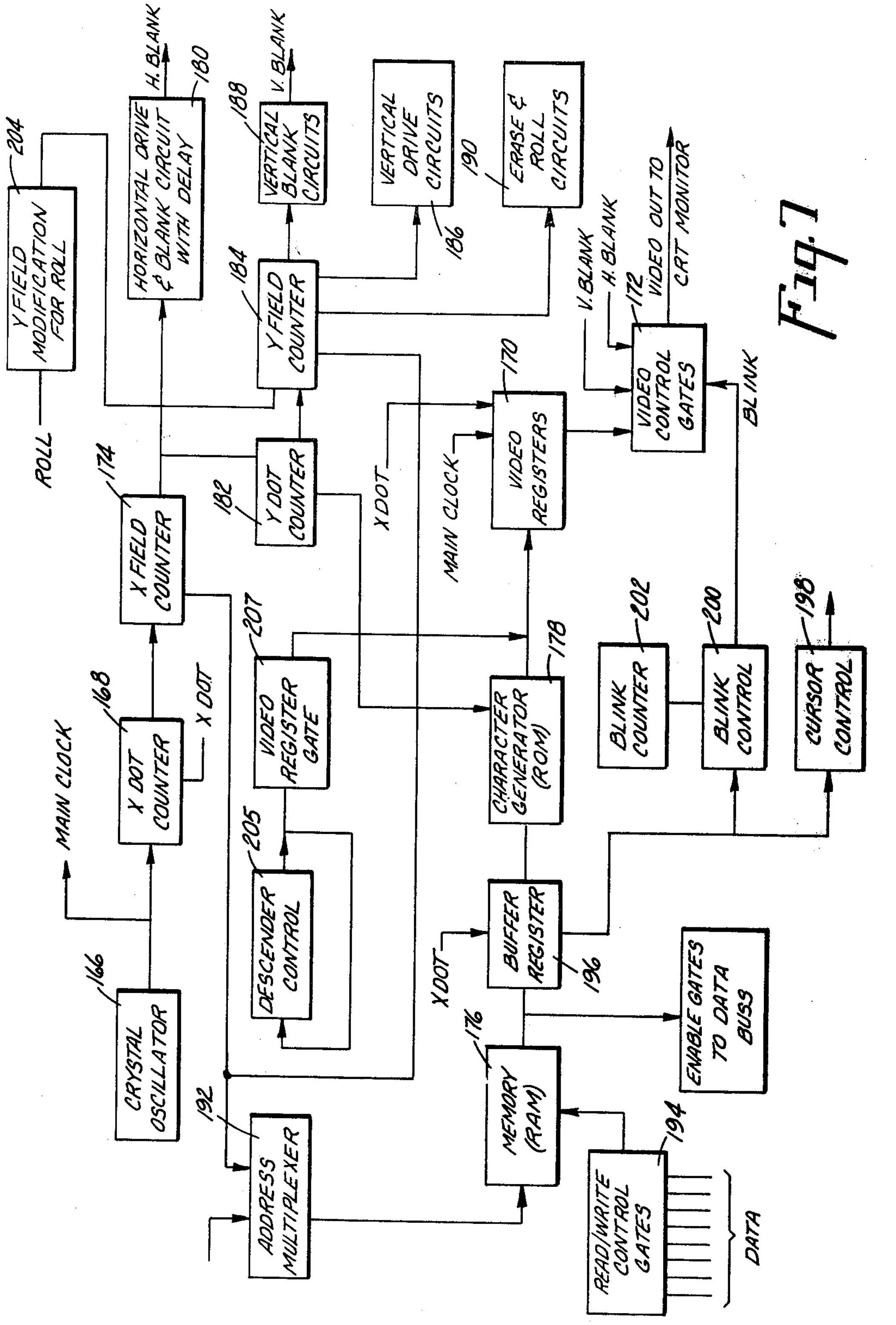

FIG. 7 is a block diagram of a portion of the character generator board.

Figure 8:
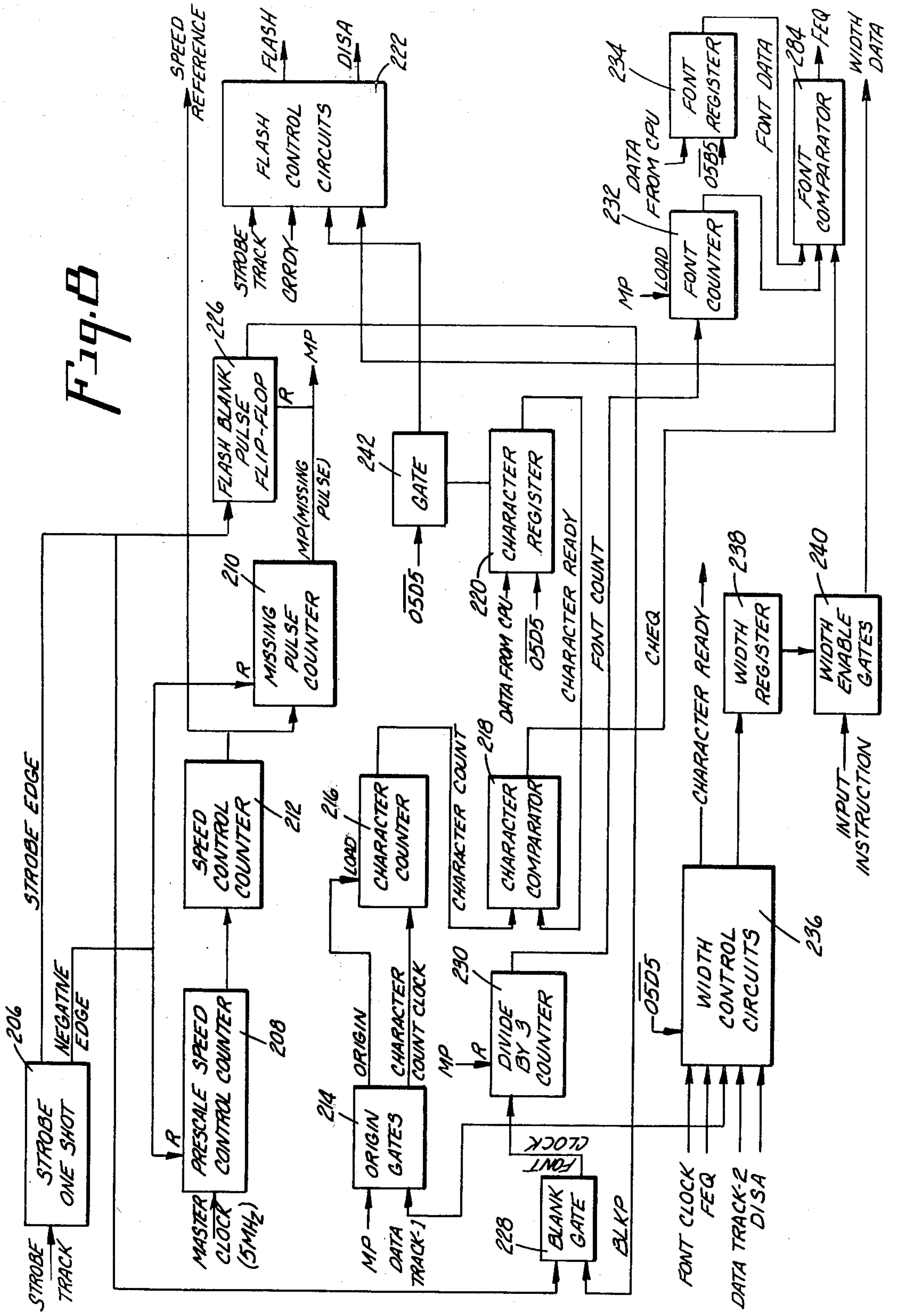

FIG. 8 is a block diagram of the font interface board.

Figure 9:
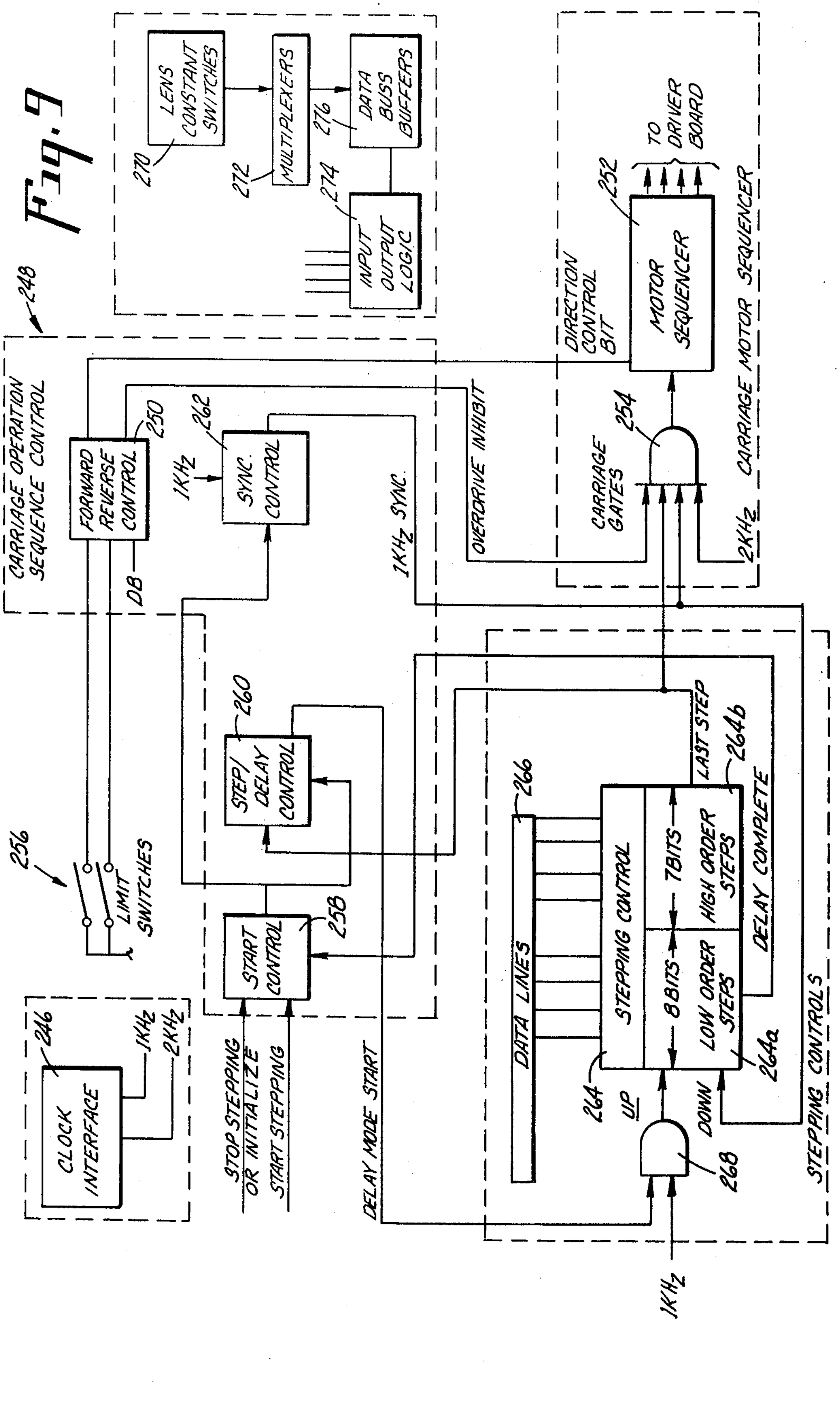

FIG. 9 is a schematic logic diagram of the stepper escapement/circuitry.

FIG. *10a* is a schematic logic diagram of the row select circuitry of the stepper boarder.

FIG. *10b* is a schematic logic diagram of the variator/collimator lens control circuitry of the stepper board.

FIG. *10c* is a schematic logic diagram of the leading control circuitry of the stepper board.

Figure 11:
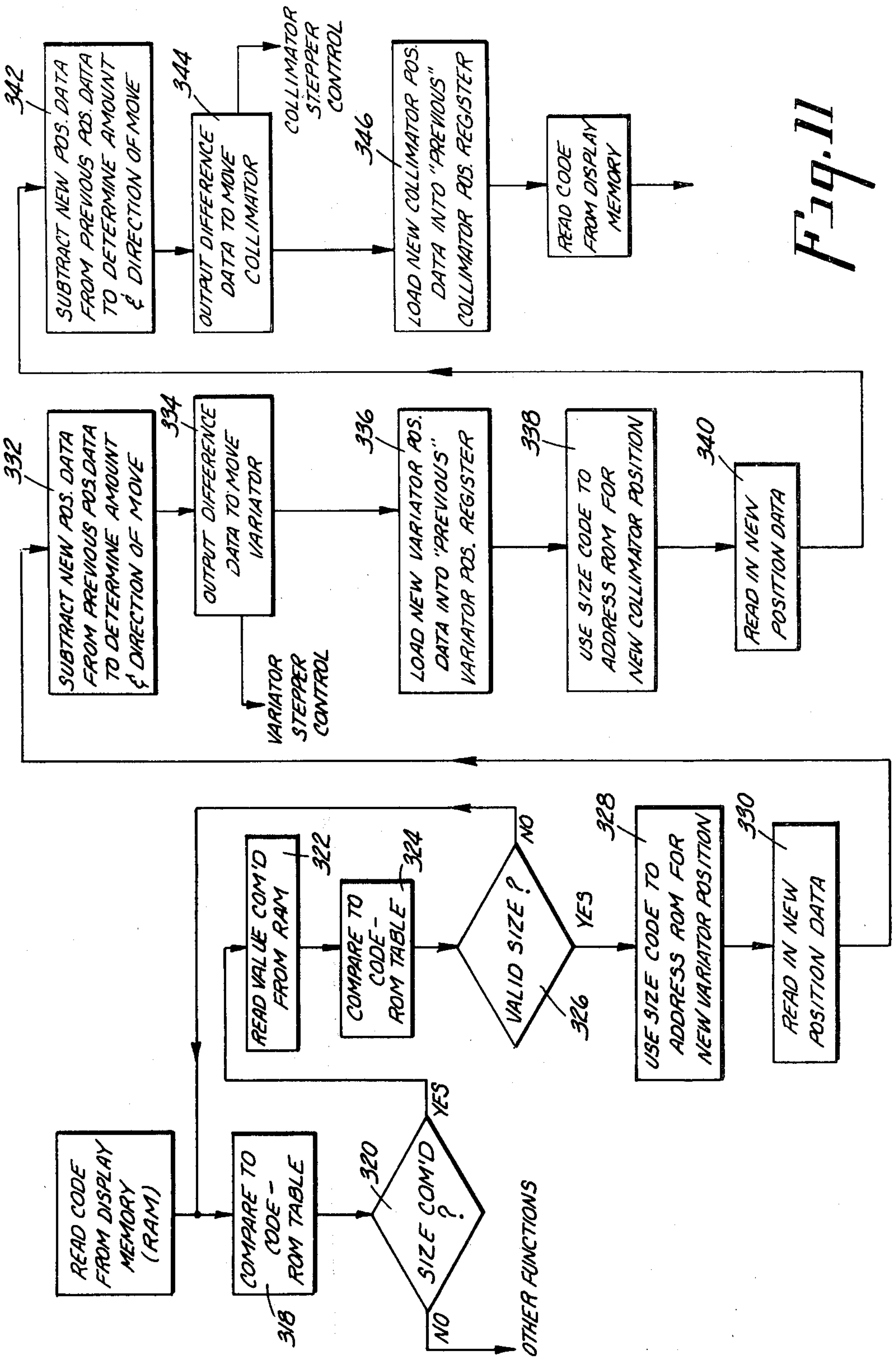

FIG. 11 is a flow chart showing the variator/collimator program routine associated control circuitry.

Figures 12, 13, 14:
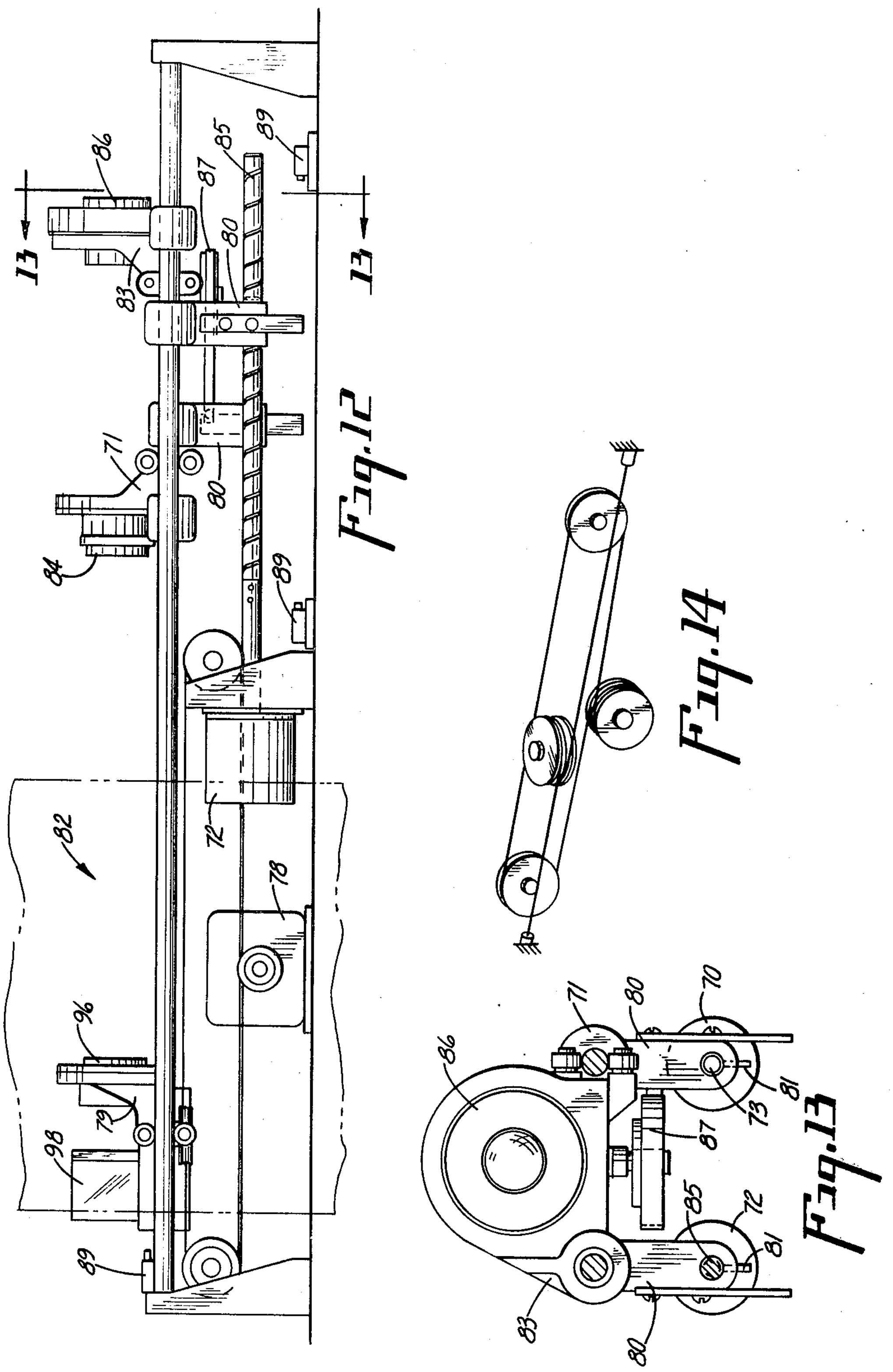

FIG. 12 is a side elevation of the lens system of a preferred embodiment of a commercial machine.

FIG. 13 is a section taken on line 27—27 of FIG. 26.

FIG. 14 is an illustration of the escapement drive.

Figure 15:
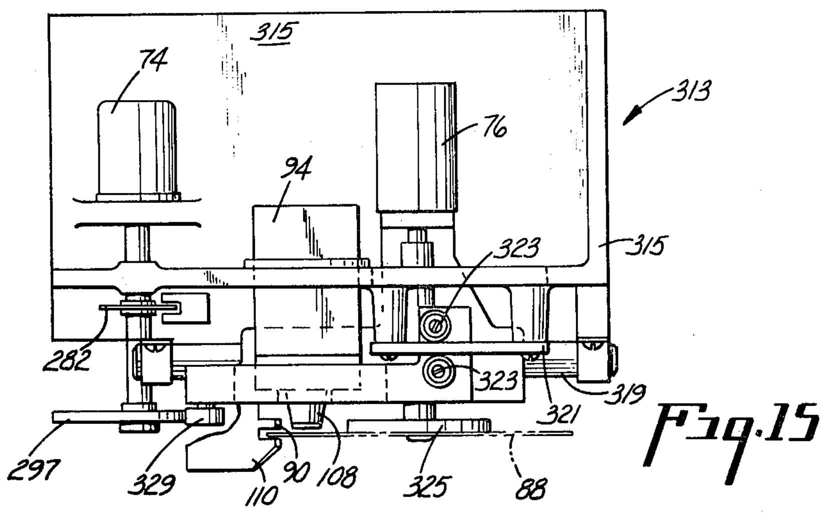

FIG. 15 is a top plan of an improved font row select mechanism.

Figure 16:
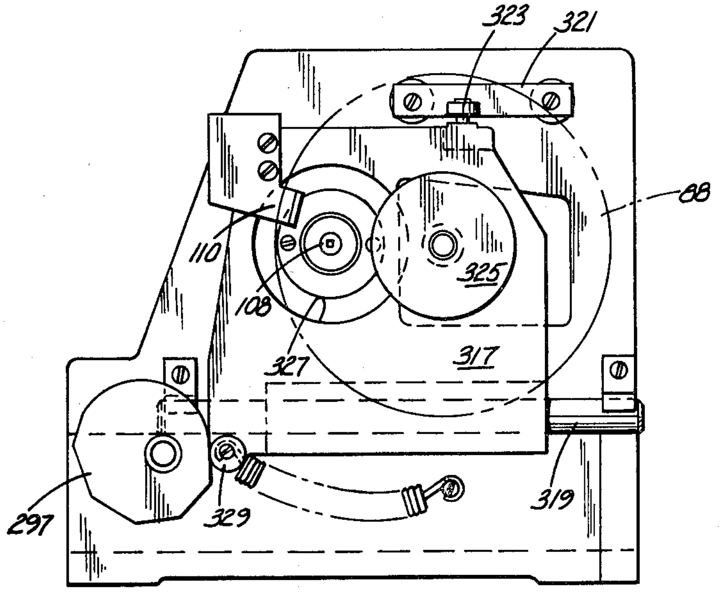

FIG. 16 is a front elevation of the font row select mechanism.

DESCRIPTION OF THE PREFERRED EMBODIMENT

This description will be presented in two major divisions (1) the electronic package and programs, and (2) a unique hardware application of the principles laid down in (1).

Figure 1:
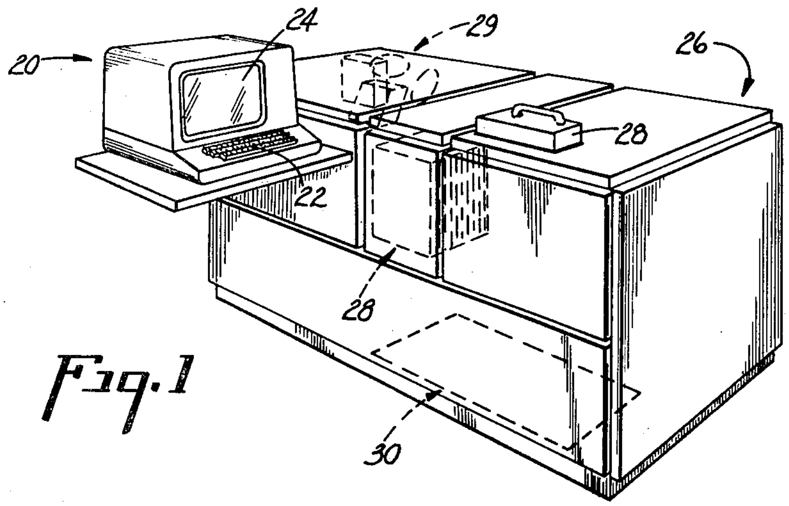
FIG. 1 is a perspective view of a preferred embodiment of the photocomposition machine of the present invention.

Referring now, more particularly, to FIG. 1 of the drawings, it will be observed that the photocomposition machine of the present invention includes an input unit generally indicated by the numeral 20, comprising an entry keyboard 22 and cathode ray tube (CRT) display screen 24. The keyboard and display screen are mounted adjacent to each other such that the operator may conveniently view both the current and previous keyboard entries on the screen. The phototypesetter unit is generally indicated by the numeral 26 and includes a cassette 27 for receiving the exposed film or other photosensitive material produced by the typesetting process, hereinafter explained. Preferably, the film cassette is of the type described in U.S. Pat. No. 3,724,945, which issued Apr. 3, 1973, in the name of F. R. Massiello, and which is assigned to the assignee of the present invention.

A major portion of the control circuitry associated with the present invention is located on a plurality of circuit boards at a card file location generally indicated by the numeral 28. The various character selection components and optical system are housed within the machine at a location generally indicated by the numeral 29. The motor interfacing and power equipment is located in the area generally indicated by the numeral 30.

Figure 2:
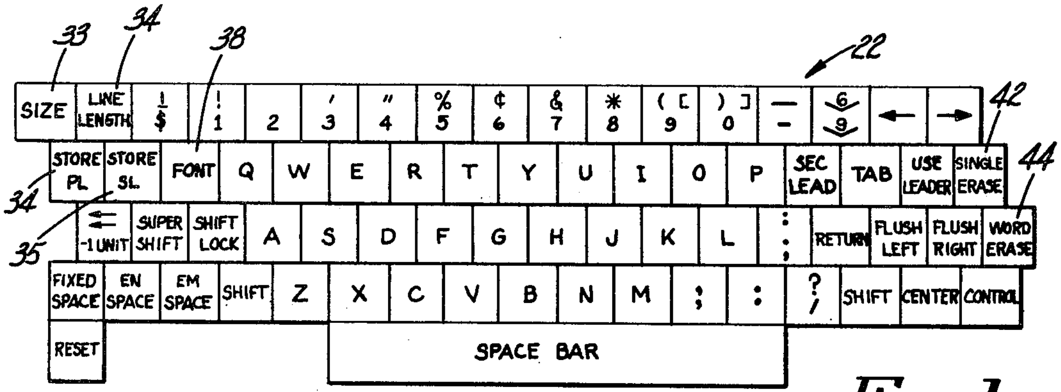
FIG. 2 is a layout view of a typical keyboard configuration which may be utilized with the present invention.
Figure 3:
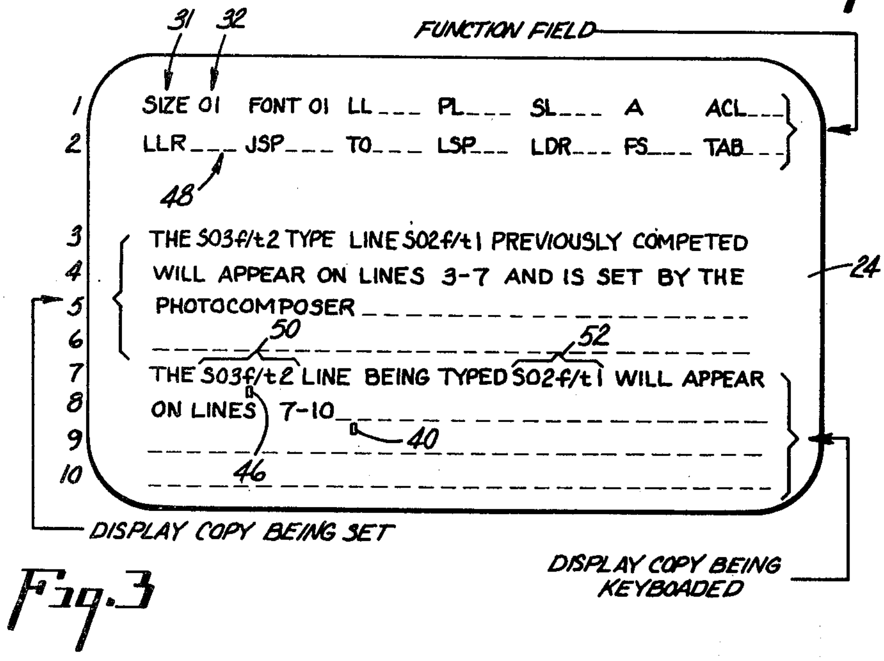
FIG. 3 is an elevational view of the cathode ray tube display screen, showing the various functions which appear in the function field.

Referring now to FIGS. 2 and 3, the preferred embodiment of the keyboard configuration and CRT display screen may be seen in more detail. The keyboard comprises 70 keys, with each key providing an alphanumeric character or a command when actuated by the operator. Each key comprises a Hall effect solid state switch in the form of a magnetically actuated integrated circuit providing an eight-bit encoded data line plus a strobe pulse. The encoded data generated by each key stroke is initially entered into a data buffer associated with a random access memory (RAM). The type character and command data from the keyboard are then shifted to a "display" portion of the RAM under control of a central processing unit (CPU) and caused to be displayed on the CRT screen by a character generator. This provides the operator with a visual record of each entry, whether such takes the form of a command or an alphanumeric character. The data buffer is actually comprised of a pair of buffers, one of which is loaded from the keyboard while the other is being read into the display portion of the memory. This allows the operator to continuously key in data.

The first two lines of the CRT display provide a function field for displaying various functions and their values, which the operator is apprised of during and after making entries, abbreviations or appropriate symbols for the various functions are caused to be displayed in a predetermined format within the function field by the character generator. Where required, space is provided adjacent each displayed function to display numerical values selected by the operator or supplied from the CPU. For example, the character point size function is displayed at 31 and is provided with appropriate spaces at 32 for a numerical value to be displayed which has been selected by the operator through the entry keyboard. Value spaces are provided within the first line of the function field for the Font, Line Length (LL), Primary Leading (PL), Secondary Leading (SL), and Accumulated Leading (ACL). On the second line of the function field, appropriate value spaces are provided for Line Length Remaining (LLR), Justification Zone (JSP__to__), Letter Space Units (LST), Leader (LDR), Fixed Space (FS) for tab, and Tab Usage Accumulation (TAB). Corresponding function keys are provided on the keyboard for Size, Font, Line Length, Primary Leading, Secondary Leading, Justification Zone (JSP & to), Letter Spacing, Leader, and Fixed Space for tab functions.

Preferably when the machine is first turned on the value spaces next to each of these functions are filled with "X's" indicating to the operator that the values must be selected. These spaces are shown blank in FIG. 3, however, for the sake of clarity. The spaces provided next to ACL, LLR, and TAB are provided with values through the CPU control. For example, as the line length is used up, the value occuring next to LLR is correspondingly updated. Similarly, as each line is leaded, the ACL value is charged. Usage of the TAB is also kept track of by the CPU and such is displayed at the end of the second Function Field line. The "A" appearing on line 1 of the Function Field indicates that the machine is in the "Automatic" mode of operation. An "M" is displayed at this location when the machine is in a "Manual" mode of operation. When in the Automatic mode of operation, the machine, under control of the CPU program, will automatically complete the type line, whereby the Erase, Roll and other operations described above are automatically carried out. If the last word entered will not fit within the lines, it is automatically shifted to the beginning of the next line. In the Manual mode of operation, the operator must make a decision where to terminate the line and whether or not to hyphenate the last word. The line is completed and the Erase, Roll and other operations are initiated only upon depression of the Reset key by the operator. A character point size is entered by depressing the "Size" key indicated at 33 in FIG. 2, followed by depression of numerical keys corresponding to the size value. A similar routine is followed to enter the line length by first depressing the key 34. Primary and secondary leading commands are entered through keys 35 and 36, respectively. Similarly, front size is selected by the operator by first depressing the key indicated at 38.

It is necessary that the operator provide appropriate values for several of the functions before the keyboard is enabled to provide type line characters to the display portion of the memory. The operator must select values for point size, line length, font, and primary and secondary leading before the photocomposer will accept type character entries. It is apparent to the operator when he has failed to select or properly enter the value, because his keyed type character selections will not appear on the CRT screen.

Once the operator has made the required function value selections, the keyboard is enable to enter the first type line character information selected by the operator. The selected type characters will appear at a "Current Line" location on lines 7–10 as they are keyed in by the oerator. A cursor 40, preferably in the form of a small rectangular mark, is displayed on the screen to indicate to the operator the space to be typed next. Erasure of previous entries may be effected through operation of the "Single Erase" and "Word Erase" keys 42 and 44, respectively. When the operator has made type line entries extending into the justification zone an appropriate marker, such as that indicated at 46, appears in blinking fashion on the screen as an indication to the operator. The value displayed in the "Line Length Remaining" location 48 apprises the operator of the space remaining and the operator makes the decision when to hyphenate or terminate the line. The line is committed for setting by actuation of the "Return" key 49 by the operator when in the Manual mode. This also causes the completed type line to be erased from screen lines 7–10 and displayed at a "Previous Line" location defined by lines 3–6 on the display screen.

It will be appreciated that as the operator is keying in a type line, he may make changes in point size and font. In order that the operator can keep track of these changes, each such command and value is displayed within the typed line, as indicated by way of example at 50 and 52 in FIG. 3. The point size and font commands and values appear in the same sequence in which they were entered by the operator. Furthermore, these commands and values are retained when the line is shifted or rolled to the "Previous Line" location. As the line is being rolled, the point size and font values displayed within the function field are updated to correspond to the values last entered by the operator. Thus, if the operator does not make a point size or font changes for two subsequent lines, he may refer to the function field, if necessary, to learn what point size and font values were last selected. The LLR and JSP values are also continuously updated for the operator.

Figure 4:
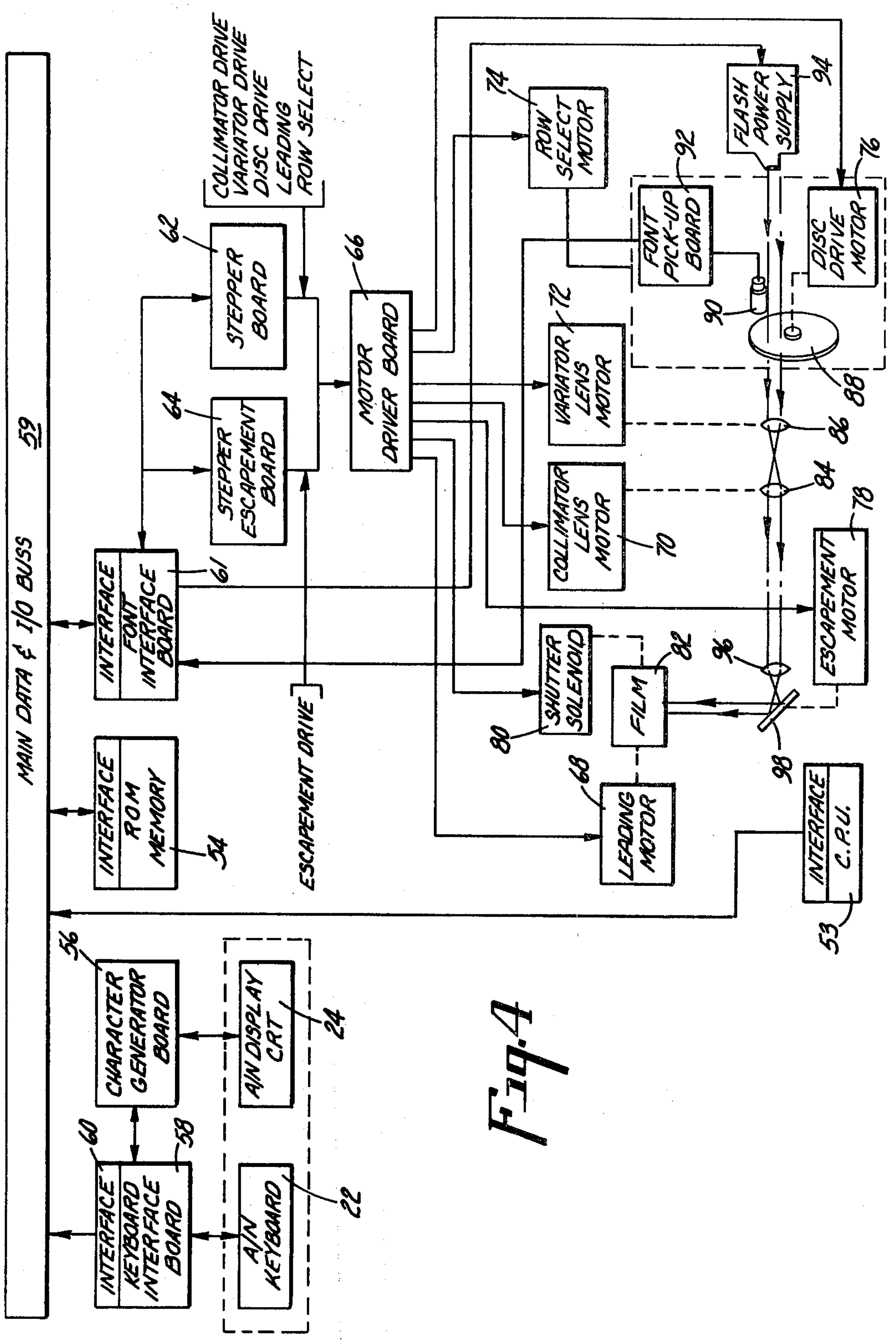
FIG. 4 is a block diagram of the entire photocomposer system of the present invention.

FIG. 4 is a simplified block diagram of the photocomposer system including the input unit. Control of the system is provided through an appropriately programmed central processing unit (CPU) 53 and a read-only memory (ROM) 54 containing an application program. In the preferred embodiment the CPU is a commercially available microprocessor, such as the Intel Corp. No. 8008 Microprocessor chip. The CPU together with ROM 54 provides handling of all input commands and type character key strokes selected by the operator. In addition, the processor handles the entry of all keyboard data into the display portion of the memory for display by the CRT. The reading of stored character width codes from the character disc, hereinafter described, and the calculating of functions related to point size and line length are also handled by the processor. In addition, the various commands controlling the stepper motors hereinafter described and the flashing of selected characters is controlled through the microprocessor and ROM. Since the CPU and ROM are so closely related to each other the term CPU, as used herein, may be construed to include the ROM as well.

All information displayed on the CRT is provided from a Character Generator Board 56, hereinafter described in more detail. The character generator board includes the above-mentioned access memory (RAM) a large portion of which may be described as the "Display Memory". Other storage locations of the RAM are used for the keyboard buffers and for scratch pad purposes, such as storing data utilized by the CPU. All functions, values, commands and type characters selected by the operator are entered into the memory, under control of the CPU, through a Keyboard Interface Board 58. Data from the CPU also passes through the Keyboard Interface Board via the Main Data Buss 59 and Interface 60.

A Font Interface Board 61 contains logic which determines, on command from the CPU, when character width code data is to be read from the character disc. This logic also controls the flash operation which produces the selected character images when the proper disc character is in the optical path, as hereinafter explained.

Control logic registers, and controls for the collimater and variator lens motors, disc drive, leading and row select motors are contained on a Stepper Board indicated at 62. A Stepper Escapement Board 64 contains the logic to control the carriage escapement assembly upon receipt of input commands and data from the CPU. Control signals from Stepper Board 62 and Stepper Escapement Board 64 are provided to a Motor Driver Board 66, which converts the signals to higher voltage and current values for proper motor operations.

Among the motors driven through the Motor Driver Board are a leading motor 68, collimator lens motor 70, variator lens motor 72, row select motor 74, disc drive motor 76 and escapement motor 78. A shutter solenoid 80 is also controlled by the motor driver board. Leading motor 68 is effective to advance the photosensitive film which is indicated schematically at 82, upon completion of the setting process of each line. The shutter solenoid 80 serves to shield the film or paper to prevent further exposure under various conditions such as when the cabinet doors being opened to change the character disc.

Motor 70 serves to position a collimator lens indicated diagrammatically at 84, in response to commands from the CPU. The variator lens motor 72 is also controlled by the CPU to position a variator lens diagrammatically indicated at 86, to provide appropriate magnification of the character images in accordance with the selected point sizes. The collimator 84 is caused to move relative to the variator 86 such that the aerial image of the variator is the object image for the collimator and projected in parallel rays to infinity.

The alphanumeric characters are stored on a character disc 88. The disc is formed from opaque film having alphanumeric characters and other information represented in transparent patterns. A plurality of concentric circles of varying radii each containing a unique type of font are present on the disc. Preferably, the characters are arranged on varying radii from the center outward, with the identical character of the various fonts appearing within the same arcuate segment of the disc.

The disc is also provided with timing marks and width codes located within a predetermined concentric circle around the disc. The timing marks and width codes are detected by a photosensor means 90, which provides signals to a Font Pickup Board 92, indicative of the angular position of the disc and, more specifically, tell which character is in position for exposure. When the disc is in proper position for exposure of a selected character, Font Pickup Board 92 provides a command to the Font Interface Board 60, which in turn effects energization of a flash power supply 94. A high intensity flash of light from the power supply causes the selected character to be projected through the variator lens 86 and collimator lens 84 to a decollimating lens 96 and mirror 98 associated with the escapement. Font selection is effected by radial movement of the disc 88 with respect to flash power supply 94. Photosensor 90 shifts with the character disc when physically moved to select font rows.

Figure 5A:
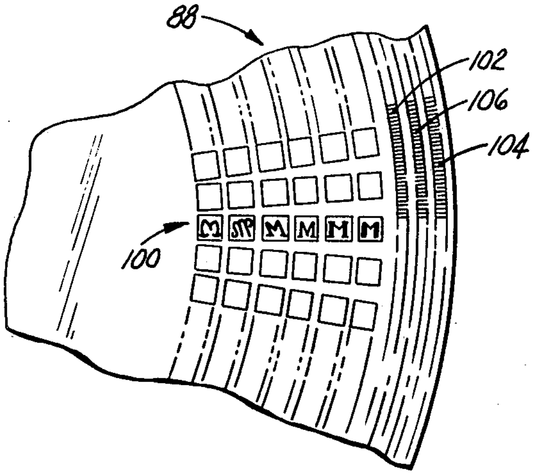
FIG. 5 is a plan view of a broken portion of the character disc associated with the present invention.
Figure 5B:
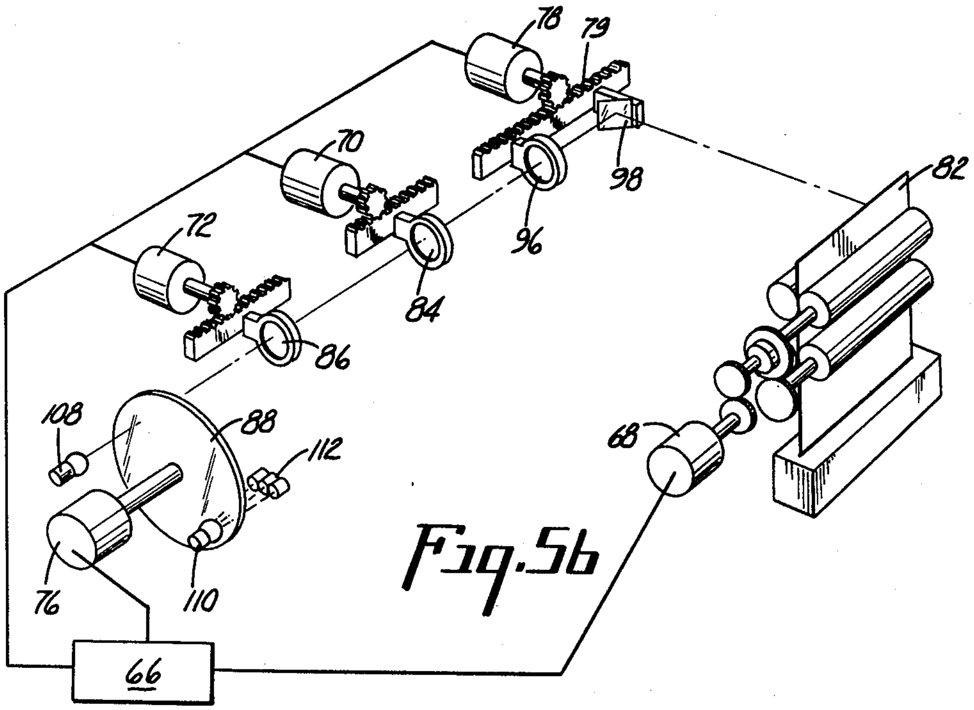
Figure 6A:
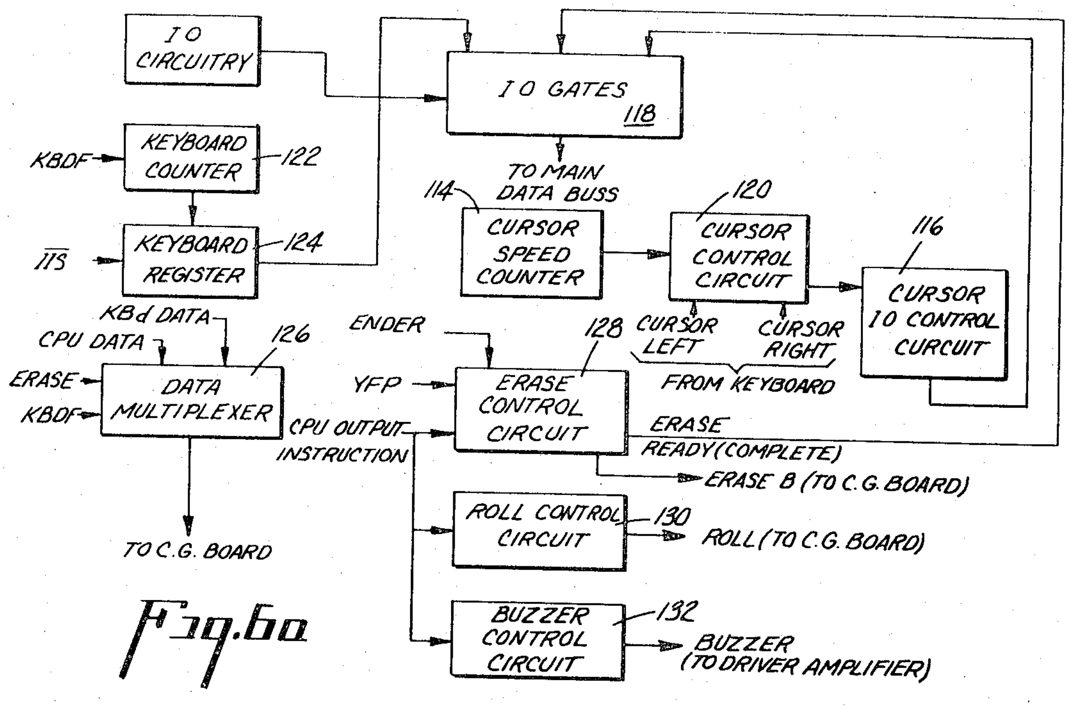
Figure 6B:
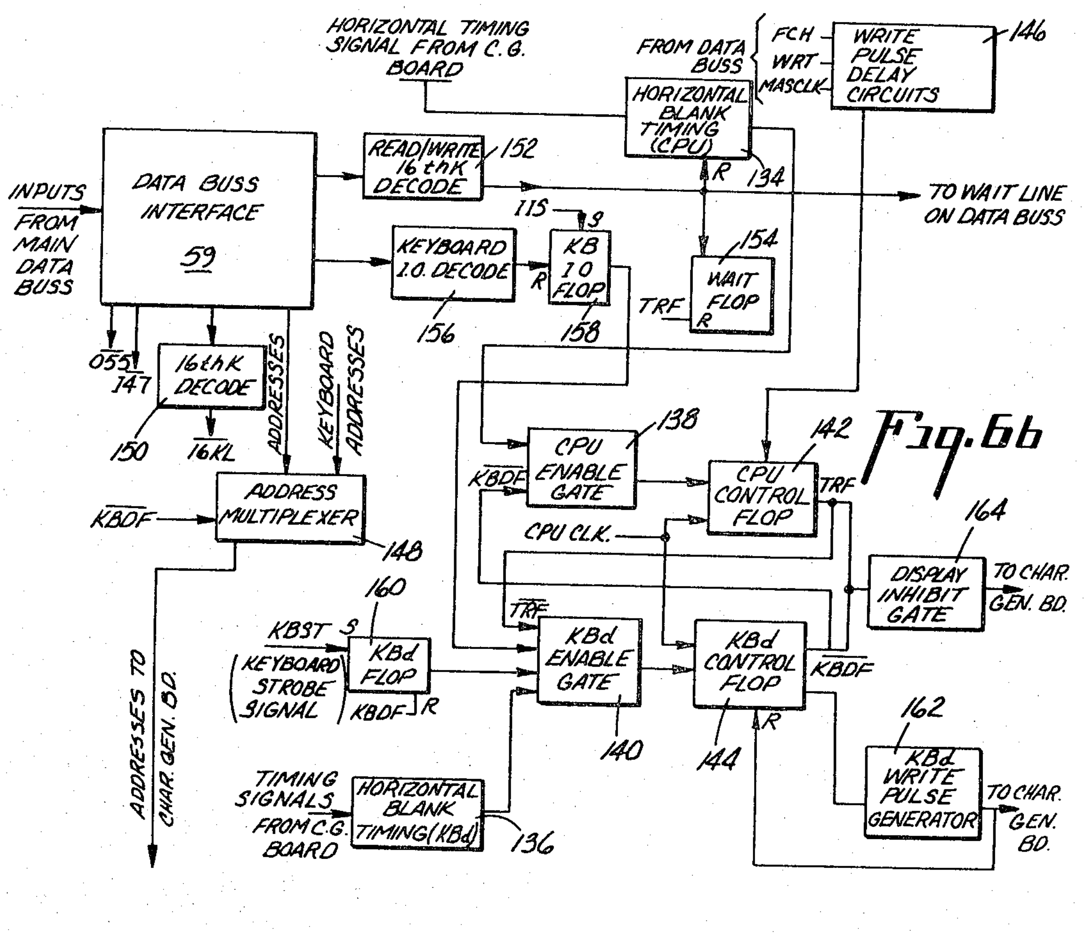

Referring now to FIGS. 5*a* and 5*b*, operation of the optical system associated character storage disc may be more fully understood. As mentioned above, the characters are arranged on a disc such that the different fonts for each character lie within the same arcuate segment of the disc. An example of such for the letter "M" is illustrated at 100 in FIG. 5*a*. The disc is also provided with a multiplicity of code tracks 102, and 104, and a timing track 106 in the form of transparent and opaque areas. Tracks 102 and 104 contain character width codes corresponding to the characters displayed within the same arcuate segment. Preferably, these codes comprise 18 bits represented by either transparent or opaque adjoining lines. The first fixed bit relates to the strobe track and each succeeding group of three bits is related to the character within the arcuate segment. Since there are two tracks providing width information, each character is assigned six data bits. The width codes per character represent five data bits plus a parity bit. Track 106 contains timing marks which, preferably, alternate from transparent to opaque 18 times per arc segment.

The disc drive motor 76 provides a means for moving the characters cyclically through a projection area adjacent a flash lamp 108, associated with the flash power supply 94. A light source 110 is mounted adjacent the disc code tracks on one side of the disc. A plurality of photosensors 112 (photosensor means 90) are mounted on the opposite side of the disc and provide a series of pulses caused by interruption of the light by the opaque areas on each code track. These output pulses are sent to the Font Pickup Board 92 and ultimately processed by the CPU. The timing pulses, in effect, tell the system the position of the character disc and, more specifically, which character is in alignment with the projection area. The width code pulses ae indicative of the width of the character which is within the projection area. This information is utilized by the CPU to keep track of the width of each character flashed and provide proper character spacing through control of the stepper escapement. A detailed description of the code track arrangements is felt to be unnecessary for the purposes of this application. The manner in which the code pulses may be handled is covered in a separate application entitled Photocomposition Machine, filed Nov. 14, 1974, in the name of Frank Scholten and Ronald Kubinak Ser. No. 523,630, and assigned to the same assignee as the present invention.

Each time flash lamp 108 is energized, such produces a character image which is received by the variator lens 86 and projected into the collimator lens 84. The light column from the collimating lens is parallel and does not come to a focus. Focusing is achieved by the decollimating lens 96, which may be positioned anywhere along the optical axis to bring the character image into focus onto the photosensitive film 82. The decollimating lens and associated mirror 98 are mounted to a carriage 79 which is moved by stepping motor 78 to provide a series of character images defining a composed line on the photosensitive film 82. Stepping motor 78 is moved under control of the CPU in accordance with the equation:

No. of Steps = Char. Width Units X Point Size/3

The positions of the variator and collimator lenses determines the size of the projected image. Stepper motors 70 and 72 are employed to move the collimator and variator lenses along the optical axis under control of the CPU to positions which will produce the selected point size for each character.

One feature of this invention which makes possible the inexpensive and very accurate phototypesetting function under microprocessor control is the ability of the controller to learn where its controlled elements are after shut-down. Otherwise, more costly calculating procedures or permanent memory would be required.

FIG. 5*b* illustrates in diagrammatical fashion the part relationships. FIGS. 12–16 illustrate a commercial embodiment. Reference numbers will be used for the same or similar parts for continuity.

The first step in the control procedure is to direct each lens carriage to proceed to its home position. Motor 70 will drive a collimator carriage 71 of FIG. 12. Carriage 71 has a drive arm 80. Helix screw 73 extends through an opening in arm 80, but is not threadably engaged. A pin 81 carried by arm 80 projects into the helix thread of the screw to provide the interconnection. The carriage 83 is drivingly connected to helix screw 85 in the same manner.

This construction is primitive in contrast to the accurate but very expensive, alternative drive arrangements available. The helix threads are quite modest in cost, and by the combination provided in this invention will deliver accurage carriage transport even better than the more costly drive alternatives.

To accomplish the necessary accuracy, the first step is the elimination of gear backlash by means of a negator spring 87 connecting and drawing the two carriages towards one another. Thus the pins 81 will be urged to ride against only one side of the helix groove of its drive screw.

Then, each carriage is provided with a sensor switch 89 located at an extreme home position beyond the normal excursion limits of the carriage. This is a starting post, and will put out a signal when the carriage arrives at the starting post.

A memory which is able to loose stored data on machine shut-down will be of no help in start-up. The machine of this invention, when power is restored, will first direct all drive motors which drive carriages having such home positions, to their home position. The sensors produce data signals. Then the operator instructs the controller, either directly from the keyboard or by means of an intermediate tape, with a signal indicating a desired location to which the lenses are to travel. With this information, the controller is then able to direct each carriage to move a given increment to its first position of operation. Any drive means which will compare a first position with a desired second position and drive a measured distance to that second position will suffice. A stepper motor and a stepper servo are examples. Since there is no known generic term, this description and the claims will use the stepper motor term in a generic sense rather than a restricted sense of one physical structure. There is no effort to predetermine a fixed motor position of any motor at start-up. The machine is preferably constructed with an interlock switch to enable disc change without literally stopping the power to the entire machine. After de-activating the interlock, a "reset" switch is closed. This, for the purpose of this invention is a start-up.

Thus it is of no concern how accurate or worn the screw and its helix groove may be. Rather, with the negator holding the carriages against one side of its helix screw groove, the number of steps a motor makes will drive the carriage a predetermined distance, within very acceptable limits, to the desired focus position. By this provision, inaccurate helix machining and or wear will be fully eliminated as a factor in proper lens positioning.

The escapement control is accomplished in exactly the same way. At start-up, carriage 79 will seek out its limit sensor 89 and produce a control signal which is then used as a control point. The controller then establishes a given number of steps of escapement motor 78 to a left margin position. That new position is then recorded and used as a left margin until deliberately altered, or the machine power is shut down.

Still another area of the illustrated embodiment of the invention is in the storage assembly 313 (FIG. 15). The storage assembly comprises generally the rotating font disc, common to most photocomposing machines, the drive means for the disc, the flash assembly to produce a strobe flash at the proper moment, according to known techniques, and the means for assembling and mounting these elements.

This invention embodies some new features which have not been employed before as will be apparent from the description as it unfolds.

The storage assembly 313 is built upon a base casting 315 which is bolted to the frame of the machine for solid support of the mechanism thereon.

A carriage casting 317 is mounted on the base casting by means of a support way-rod 318 and a track 319. Two rollers 320 guide the carriage 317 and its lateral shifting movement, and are adjustable to determine the vertical attitude of the carriage.

The font disc is illustrated in dotted outline, and the machine provides a disc spindle 322 upon which the disc is mounted. A motor 285 is provided to drive the spindle at a proper rotating speed.

A flash power pack 326 provides the necessary power for the strobe light within the light 108.

Prior art devices have shown an illuminating system which is of sufficient area that all the font paths of a disc can be encompassed within the light beam. Then, shutters are employed to move to the proper font path and to frame the area of exposure. For a disc having just three tracks, the light in such a structure must be sufficiently large in diameter to embrace the three tracks with a slight extra space for assurance that the edge tracks are fully illuminated. The light, therefore, must be large enough to embrace the same area in a vertical direction and therefore the area being covered by the illuminating flash is nine times the area that is actually used at any one time.

According to the illustrated construction, the light tunnel 108 is a tapered tunnel with a lens which condenses the illumination into an area which is substantially the size of the character to be illuminated and no more. Then, the spindle 322 with the attached disc is shuttled laterally to bring the selected font row into register with the light spot. This is in contrast to using shutters to allow only a light spot out of a larger light beam.

The flash power pack 326 is mounted in a fixed position on the main base casting 315 and the light tunnel 108 projects through an opening 327 in the casting of carriage 317. See FIG. 30. The tapered light cone 108 is seen projecting through the opening 327 and it will be seen that slight movement of the spindle 322 will position a track of a disc in register with the light tunnel projection opening.

The carriage 317 is shifted laterally on the way-rod 18 by means of a cam 296 and a follower 329 on the carriage 317. A motor 331 drives the cam into a selected position. The motor 331 is a stepper motor, preferably, in order that it may be programmed by a controller to move into any one of selected positions to present a flat surface to the follower 329 and establish the selection of a particular font row. There must be one flat surface for each font row.

FIG. **10*a* illustrates a control for the cam 296. A row shift detector 284 has a series of black marks on a small locator cam 282, one of which is larger than the other. Hence, as the motor 285** rotates the cam it can determine when the larger of the blocks is in the detect position.

The row select control is accomplished in the manner similar to that described with respect to lens carriage location and control. At start-up, the motor 285 will rotate the cam until the larger segment is detected, and that larger segment acting as a position sensor will produce a control signal which is then used as a control point. When the machine is started up, the rotation takes place until the sensor provides the control signal. The controller then establishes a given number of steps of the stepper motor 285 to a given row as determined by the information the operator has placed into the memory by the keyboard, or indirectly to the tape control. That new position is then recorded in the memory and used as a starting position from which the next rotational position is measured when and if the operator should choose to select another row from the disc. Each time the machine is started up this selection is made from start position and therefore permanent memories and other complex calculations are unnecessary.

KEYBOARD INTERFACE

With reference to FIGS. **6*a* and 6*b*, the functions and operation of the Keyboard Interface circuit board 60 (FIG. 4) may be more fully appreciated. This circuit board provides interfacing between the main data buss 59 and the Character Generator board 56. In addition, the keyboard is interfaced with the rest of the system through this circuit board. Thus, all keyboard data is entered into the display memory under control of the Keyboard Interface, as hereinafter explained. The basic signals supplied to the Generator board 56** by the Keyboard Interface are:

(a) Timing signals and data to the Display Memory
(b) Keyboard write signals to the Display Memory
(c) Address multiplexer control signals required to inhibit the Display Memory addressing during blank when a keyboard or CPU input to the display Memory is being processed. The circuit board also supplies the actual addresses for these two inputs plus data to be stored in the Display Memory.
(d) Timing signals required for the Four Line Roll, hereinafter described.

Circuits to control the cursor movement on the CRT screen are provided on this board. As mentioned above, the operator controls cursor movements from the keyboard with two keys being provided for this purpose. The depressing of one key causes the cursor to move to the right on the display screen, while the other causes movement to the left.

A cursor control circuit 120 is shown in FIG. **6*a* to have a cursor left input and a cursor right input from the keyboard 22. The cursor control circuit 120 receives inputs from a cursor speed counter 114, and inputs to a cursor input/output control circuit 116 which inputs to data buses input/output gates 118 which inputs to the main data buses 59**.

As explained below, a keyboard counter 122 counts the key strokes from the keyboard and transfers this count to register 124. Register 124 inputs to I/O gates 118 which inputs to the main data buses.

As explained above, data generated by each key stroke is initially entered into a data buffer prior to its being displayed on the CRT screen. The data buffer is actually comprised of a pair of buffers, one which is loaded from the keyboard while the other is being read into the display portion of the memory. This allows the operator to continuously key in data.

One of the buffers is always being unloaded as; the other is in a condition to receive data being entered by the operator through the keyboard. It will be appreciated that this arrangement permits the operator to continue keying in data without hesitating for the CPU program to shift such into the main display memory.

The Keyboard Interface is also provided with a data multiplexer 126 which handles data from the CPU via the standard interface 58 and keyboard data from the input keyboard. This data is selected under control of the KBDF select signal which is obtained from the keyboard control flip flop, hereinafter described. This signal is normally low and transfers through the CPU data when the signal goes high (KBDF). When low (KBDF), it enables the passage of keyboard data to the Character Generator board. The data multiplexer also serves a function relating to the four line roll operation which moves a display of completed type line from lines 7-10 to 3-6 on the CRT screen. Before these lines are transferred, the top four lines must be erased. This routine is intiated by an "Erase" input to the data multiplexer which disables both inputs and output to the Display Memory. Erase Control Circuit 128 is provided to control the number of Display Memory locations to be erased by loading such with "Zeros". The erase operation is initiated by an output instruction from the CPU and a timing signal YFD from the Character Generator board. The Erase operation is terminated by an ENDER signal, which also eminates from the Character Generator board. Display Memory addresses are continuously being presented to the Display Memory. When the address corresponding to the first text line occurs, the edge of the YFD timing signal enables the generation of the "Erase"signal causing "zero"data to be selected. The erase control circuits also generate an "Erase B" signal which goes to the Character Generator board to enable the writing of zeroes into the display memory erasing each character block as its address comes up.

The ENDER signal is generated on the character generator board after the fourth line of the "current line" area of the CRT screen has been erased. This signal is effective to reset the Erase Control Circuit and thereby terminates the erase mode. The Erase Control Circuit also provides an "Erase Ready" signal during the erase operation which is sent to the data buss I/O gates 118 to inform the CPU not to write any new data during the erase operation. After the erase is complete, this signal changes to "Erase Complete".

After the erase operation has been completed, Roll Control Circuit 130 causes the bottom four text lines on the CRT screen to be transferred in response to a CPU instruction. As hereinafter described, this operation is effected by modifying the Y Field Address to the display memory. This modification is carried out on the Character Generator board in response to a Roll Signal which initiates te address modification. The addresses remain modified until the next roll command is received, at which time the Y Field Addressing returns to its original mode. It will be appreciated that during the roll operation no data is removed from the Display Memory, but rather the sequence of displaying the information is changed.

If desired, a Buzzer Control Circuit 132 may be provided to control an audible alarm located on the Driver Board 66. Operation of the alarm informs the keyboard operator of various conditions, such as keyboard entries exceeding the line length.

The characters which are displayed on the CRT screen are the result of output signals from the character generator as hereinafter explained. The character generator receives data from the display portion of the memory and generates the character signals in response thereto. In order that the display remain clean, it is essential that the character generator not receive data from the memory while data is being written in from the data buss or input keyboard. This problem is handled by permitting reading and writing into the display memory during the horizontal blank time of the display only. Horizontal timing signals are received by the Keyboard Interface to control the passage of data to the display memory during horizontal blank time only. These functions are diagrammatically indicated by blocks 134 and 136 in FIG. *6b.*

It is also necessary that the reading and writing into the display memory be shared between the data buss and the keyboard. This time sharing operation is handled by a CPU enable gate 138 and a keyboard enable gate 140, and associated control flops 142 and 144, respectively. Horizontal blank timing circuit 134 generates an output signal that controls one input to enable gate 138. The other input to the CPU enable gate is a KBDF signal from the keyboard control flop 144. This signal indicates whether or not the keyboard is being serviced. A high output signal from the CPU enable gate 138 will enable the CPU flop 142. This will occur only during a horizontal blank period of the CRT and when a keyboard entry is not being processed.

The CPU control flop 142 sets up conditions necessary for the CPU to read from or write into the display memory in the character generator. The CPU control flop, when enabled by gate 138, is clocked by a buffered version of a CPU clock signal. The CPU control flop is reset by a write pulse delay circuit 146 which terminates the CPU read or write processing. The delay generated by this circuit is necessary since the output of the CPU control flop 142 controls addressing of the display memory. An address to the display memory must remain for a predetermined time interval after any "fetch" or "write" pulses have been terminated. Since the fetch (FCH) and write (WRT) signals are used to reset flop 142, the delay circuit is required. The output (TRF) from the CPU control flop, when high, disables the keyboard gate 140, which in turn disables the keyboard control flop 144.

Standard interface 60 supplies addresses from the CPU to the display memory on the character generator board. These addresses are handled by an address multiplexer 148, which also receives addresses from the keyboard. The addresses which the multiplexer select is controlled by a select line signal KBDF which comes from the keyboard control flop 144. The signal causes the multiplexer to either output addresses from the data buss (CPU) or from the keyboard.

The keyboard interface is also provided with a 16th K Decode Gate 150 which decodes addresses from the standard interface to determine when the last K of the memory is being accessed. It is this portion of the RAM which is utilized by the CPU for scratch pad purposes. The Standard Interface 60 also handles a Read/Write 16th K signal which is recognized by a decoder indicated at 152. This signal indicates if the CPU is going to read from or write in the 16th K of the memory. This decode is necessary in the event the logic is displaying a line on the CRT, the CPU can be placed in a "Wait" condition until a horizontal blank period is reached. This is carried out by the Wait Flop 154. When a horizontal blank period is reached, the Wait flop is reset by the TRF signal from CPU control flop 142. The Read/-Write 16th Decode Signal also resets horizontal blank timing circuit 134.

Four input conditions must be met in order for the keyboard enable gate 140 to be enabled. As mentioned above, one of these inputs is the TRF signal from the CPU control flop. A second signal comes from the Standard Interface 60 through a keyboard I/O Decoder 156 and keyboard I/O Flip Flop 158. Keyboard counter 22, as mentioned above, counts the key strokes from the keyboard and transfers this count to register 124 in response to an IIS input command. An error would result if the transfer to the register occurred at the same time a KBDF count pulse was received from counter 122. Therefore, the IIS input command is detected by the Keyboard I/O Decoder 156, which in turn resets flip flop 158 to disable and further keyboard input (KBDF pulses) by disabling keyboard enable gate 140. When the input command is completed, the IIS signal from the standard interface sets flip flop 158 and re-enables keyboard entry. The third enable input to gate 140 comes from a keyboard flop 160 which is set by a keyboard strobe signal KBST. The purpose of the strobe signal is to indicate that the keyboard input is ready to be stored in the keyboard buffer portion of the displaying memory.

A keyboard Write Pulse Generator 162 is effective to reset the keyboard control flop 144 upon completion of a timed write pulse to the displaying memory. The output of both control flops 142 and 144 go to a display inhibit gate 164, the output of which disable display memory addressing and enable either CPU addresses or keyboard buffer addresses.

CHARACTER GENERATOR BOARD

With reference to FIG. 7 of the drawings, the functions Character Generator board will be described in more detail. As mentioned above, the character generator per se, together with the RAM, is located on the Character Generator Board 56. The main purpose of the character generator is to display symbols on the CRT screen in accordance with codes contained in specific locations in a 1 K memory portion of the RAM. Of the 1,024 memory locations, 640 are used to display two lines of the function field and 8 lines of the text including the "current" and "previous" line locations on the line display screen. Sixteen locations within this memory are allocated to the two keyboard buffers described above, and the remaining locations are available for work space as required by the CPU program. The code bits from the RAM are used to address locations of a ROM associated with the character generator.

Preferably, all lines on the CRT screen are 64 characters in length. The two lines provided for the Function Field are followed by two blank lines which are used to separate the function field from the two text areas. Symbols are displayed by the CRT by controlling the on-off time of an electronic beam and its horizontal and vertical deflection. The symbols are made up of an arrangement of lighted dots on the screen. A dot pattern, called a character block, preferably is made up of 7 dots in width and is 11 dots high. Preferably the character blocks are separated by 2 dots for horizontal spacing and 5 lines for vertical spacing. The symbols are stored in a special read only memory (ROM) which contains 128 symbols arranged in character blocks. These blocks are selected by 7 of the 8 code bits stored in the display portion of the RAM. Codes for the various commands and functions of the function field are retained within the ROM, such that they are always displayed on the CRT screen. Four other address inputs allow the character generator to present data for 1 horizontal line slices of the symbol selected at its output. By consecutively addressing horizontal slices, the entire character block is accessed.

The basic functions of the character generator circuit are shown by FIG. 7. A detailed description of the cathode ray tube and its associated circuit is felt to be unnecessary for the purposes of this application as such circuits are well known in the art. The main control timing for the CRT is derived from a crystal oscillator 166, with each cycle of the oscillator representing one dot on the screen. Preferably, the frequency of the oscillator is 11.059 MHZ. One dot on the screen represents a beam of light with a duration of 90.4 ns. The main clock from the oscillator 166 is input to an X Dot Counter 168, which divides the main clock frequency by 9. It is also used to generate 7 horizontal dots of each character block and 1 dot space on either side thereof. The output of counter 168 is loaded into a video shift register 170 and is shifted under control of the main clock input to a video control gate 172.

The X Dot Counter 168 also feeds an X Field Counter 174 which defines which of the 64 characters on the line the X Dot slice belongs to. Outputs of the X Field Counter supply the low order address inputs to the display portion of RAM 176. Eight-bit codes from the RAM select the symbols stored in the ROM of character generator 178. The output of the X Field Counter 174 also generates a signal which is sent to the Horizontal Drive and Blank circuit 180 of the CRT. X Field Counter 174 is a divide-by-80 counter, with 64 output counts representing 64 characters on a line and 16 counts are for enable time for horizontal retrace.

A Y Dot Counter 182 also receives the output of the X Field Counter and is used to define the vertical slice of a symbol. Once the symbol to be displayed is selected by the display memory the Y Dot counter outputs addresses of the proper Y slice of the character block. This allows the proper X dot information to be loaded into video register 170. The Y Dot Counter is a divide-by-16 counter, with 11 counts for the character block and 5 for the blank in between the lines.

The Y Dot Counter feeds a Y Field Counter 184, which defines which vertical line is to be displayed. The outputs from this counter form the high order address for the display memory 176. This counter is a divide-by-16 counter, with the first two counts for two blank lines above the fixed Function Field. The next two counts are for the two Function Field lines and the two following are for the two blank lines which separate the Function Field from the line display area (Lines 3-10) on the CRT screen. The next 8 counts are for the "current" and "previous" line locations on the screen, and the final two counts allow for time required for vertical retrace.

Output of the Y Field Counter 184 is also supplied to a vertical drive circuit 186, vertical blank circuit 188, and erase circuit 190. The vertical drive circuit 186 and horizontal drive circuit 180 are required to present to the CRT properly timed drive signals. Horizontal drive is derived from the X Field Counter 174 and is timed through the horizontal drive and blank circuits 180. The vertical drive presents a pair of drive signals to the CRT in a similar fashion but they are derived from the Y Field counter 184.

Horizontal and vertical blanking of the CRT is required for proper format to be displayed on the screen. The horizontal blanking signal blanks out the video from the time the last horizontal dot of the 64th character on a line has been displayed to the time the first horizontal dot of the first character on the next line is displayed. This prevents streaks of light and smearing before and after the lines. It also prevents streaks of light through the symbols on the screen. It is during this time that keyboard and CPU addressing of the RAM memory is allowed. The horizontal blank signal originates at the X Field Counter 174 and is shaped by the horizontal drive blank circuits 180. The horizontal blank signal (HBLANK) also controls one of the inputs of the video control gates 172 to disable the loading of the video registers, causing video "off" signals to be shifted to the video control gates.

The vertical blanking signal (VBLANK) blanks out character lines and overlap the horizontal blank from one side of the line to the other. It also blanks out the video signal long enough for it to retrace from the bottom of the screen to the top of the screen. This prevents streaks of light from being seen during vertical retrace. The VBLANK signal also goes to the video control gates 172 and serves to shut such off during the duration of the signal.

Addresses received by the character generator board are multiplexed in an address multiplexer 192 connected to the display memory address lines. To prevent streaking of the CRT, writing into the RAM memory is allowed during horizontal blank time only. During this time, the data is entered by way of eight data input lines and Read/Write Control Gates indicated at 194.

As mentioned above, character information in the RAM is accessed by the X Field and Y Field Counters 174 and 184 which effect reading of the character codes from the RAM to the ROM of character generator 178. In order to compensate for propagation delays of the RAM, a buffer register 196 is provided between the RAM and character generator 178. This register stores the output of the RAM in order that the display memory addresses can be changed to the next symbol to be displayed while the character generator is operating on the symbol stored in the buffer register. Thus, the X-Y addressing is actually one character ahead of the displayed character. The X Dot Signal is used to load the buffer register just before the X Field Counter changes. Also, since the first character on the line is stored, the character being displayed at this time is erroneous and must be blanked. In the same manner the last character on the line is displayed one character late, and the horizontal blanking signal must be suppressed for this character. This is done by delaying the horizontal blanking signal (HBLANK) by one character time. This allows both the display memory and its associated circuitry, plus the character generator and its associated circuitry to delay times approaching the "X Dot Frequency Rate".

As described above, the cursor is a completely displayed character block used for editing and other functional purposes. By stepping the cursor across the CRT screen it appears to be a pointer which may be used by the operator as a marker, or as a warning signal, or for editing purposes. The cursor is controlled by the presence or absence of the eighth bit in the addressed RAM location. If the eighth bit is present, the cursor control 198 accepts such from buffer register 196 and inverts the output of the video register, when so required.

The character generator is also provided with a Blink Control 200 which is used to obtain the attention of the operator when the justification zone is reached by blinking the justification marker. The blinking rate is controlled by a blinker counter 202 which operates at a pre-selected frequency. The blink control serves to blank out the video at a periodic rate determined by the frequency of the blink counter. This is accomplished by controlling one of the inputs to the video control gates 172.

The Erase and Roll operations are carried out in part by elements of the character generator board. As described above, the erase operation is carried out by first forcing a write of "zeroes" to the memory for the first four lines (lines 7–10 on the screen). At horizontal blank after the fourth line, the output of the Y Field Counter 174 is modified by a Y Field Modification Circuit 204 in response to a "Roll" signal received from the Roll Control circuit 130 on the Keyboard Interface board. This modifies addressing by the Y Field Counter and causes the display of the completed type line to be shifted to lines 3–6 on the CRT screen. The Roll is controlled indirectly by the operator when he commits type line by depressing the "Return" key. In addition to causing the Roll operation, depression of the Return key caused initiation in the type setting operation under control of the CPU. When the operator completes the next line, depressin of the "Return" key removes the "Roll" signal to circuit 204, thereby returning the Y Field Counter to its original or unmodified mode.

A Descender Control 205 is provided which modifies the Y Dot Counter outputs. Descenders are handled by blanking of the top three rows of the character block during the first scan and subsequently, on blanking on a partial second scan, to display the descender. The descender blanks by controlling the third input to a video register gate 207, which inhibits loading and forces shifting of the blank data to the video output.

An ability to inhibit type line entries from the keyboard, is achieved by storing the various commands and their selected values in RAM. The CPU program controls the entry of all keyboard data through the two keyboard buffers. Prior to each shift of data from one of these buffers to the display portion of the RAM, the program accesses the RAM to see if the required function values have been entered into the RAM. If they have not, the type line data in the buffer is not allowed to pass to the RAm. Thus, they are not displayed or processed. On the other hand, if all required values have been entered, the type line data is read into the RAM and displayed by the CRT. In the preferred embodiment, values must be furnished by the operator for Line Length, Font, Point Size, Primary and Secondary Leading.

FONT INTERFACE BOARD

The Font Interface Board 60 performs most of the operations required for proper character selection from the character disc and its exposure on the photosensitive film. It also controls the reading of width data of the disc character and provides speed reference signals which are routed to the Stepper Board 62 to control the speed of the character disc. Speed changes of the character disc are also handled through the Font Interface board in response to signals from the CPU control program. Energization of the flash power supply 94 is also controlled through the Font Interface board.

With particular reference to FIG. 8, the various functions and operations of the Font Interface board may be more fully understood. An amplified signal from the strobe or timing track 106 of the character disc is provided to a Strobe One Shot circuit 206 which outputs a pair of signals. One of the signals identified as the "negative edge" (NEDG) is generated for each black-to-white transition detected on the strobe track. The signal is used to reset a prescale speed control counter 208 and a "Missing Pulse" counter 210. The output of the prescale speed control counter is provided to a speed control counter 212, which in turn provides a speed reference signal which ultimately causes the character disc motor to turn at the desired speed.

The negative edge (NEDG) input to the counter 208 synchronizes the counter output to a master clock input, preferably of 5 M HZ. The input to the speed control counter is counted down and becomes the reference for the disc speed. This counter is a variable module counter and its count can be changed by jumper wire or by program control. The speed reference signal from counter 212 and the negative edge signal (NEDG) are compared in frequency on the stepper board and serve to control the speed of the disc. If negative edges are being generated at a rate proportional to that of the speed reference signals, then the disc is turning at the desired speed. The NEDG signal is also used to reset counter 210 to ten. Speed reference signals will normally count up this counter to eight. The counter is then reset by the next negative edge signal.

At a predetermined location on the disc, there are four black bits in a row in the timing track. When these four bits are detected, counter 210 will be caused to overflow, thereby providing a "Missing Pulse" (MP) signal which is utilized for flash timing purposes. This feature of the photocomposition machine is disclosed in more detail in the copending U.S. patent application entitled PHOTOCOMPOSITION MACHINE, filed concurrently with the present application in the name of Frank Scholten and Ronald Kubinak, assigned to the assignee of the present invention.

The MP is gated with the amplified signal from one of the width data tracks through Origin Gate 214, containing two gates, the first of which allows MP to pass through when the Track 1 data is "white". This condition allows only one pulse through per each character on the disc. This pulse is used to define the origin and presets a character counter 216 to a count of one, representative of the first character on the disc.

The second gate at 214 allows pulses when the Track 1 data is "black". This condition allows a total predetermined number of pulses, preferably 111 in number, to be gated per disc revolution. These pulses represent the remaining characters on the disc and are used to count "up" character counter 216. The output of this counter represents, in binary form, the position of the disc at all times. The output of the character counter 216 is fed to a character comparator 218, which also receives an output from a character register 220. Data from the data buss containing the number of the next character to be processed is loaded into character register 220 in response to a command (O5D5) from the CPU. The output of comparator 218 is fed to a flash control circuit 222 then to a font comparator 224. This signal is used to enable the flash control circuitry and is used in conjunction with a font equality signal (FEQ) to enable width reading circuitry.

Referring back to the strobe one shot 206, it will be seen that the second output, defined as "Strobe Edge" (SEDG) is fed to a flash blank pulse flip flop 226 and to a blank gate 228. The SEDG signal is comprised of a series of pulsed coincident with and generated by a transition on the strobe timing track. These transitions may be either black-to-white or white-to-black. Each pulse or transition is related to the center of a bit of width data on the data tracks. A series of three bits on each track represents the width data for one font. By counting sets of three of these strobe edges, it can be determined which font is being processed. In the preferred embodiment there are two transitions per sector or arcuate segment which do not represent font data. These pulses are generated by white spaces following four consecutive black spaces and are hereinafter referred to as "flash windows". The flip flop 226 and blank gate 228 perform the function of disabling these two pulses. The MP pulse reset flip flop 226 and the output (BLKT) therefrom disable blank gate 228, thereby ignoring the strobe edges of the flash window. The trailing edge of the flash window then set flip flop 226 and enables subsequent strobe edges to pass through.

These modified edges are then divided by three through a counter 230, the output of which is provided to a Font counter 232. The divide-by-three counter 230 is initialized by the MP signal, which also serves to load each count into font counter 232, whereby the font counter maintains the current position of the disc. A font register 234 is loaded with font information from the CPU in response to an output instruction (O5B5). Font data from register 234 is fed to comparator 224 where it is compared with the data from font counter 232 in response to the CHEQ enabling signal from character comparator 218. Upon comparison, comparator 224 provides an output defined as the font equality (FEQ) signal. Character widths are read from the disc in the following manner. An output command (O5D5) from the CPU sets up with control circuits 236 for a width reading. When font equality is obtained, as indicated by the FEQ signal, font clock pulses are enabled and cause the shifting of Track 1 and Track 2 data into width register 238. The FEQ signal occurs for only 3 pulses, after which width control circuits 236 are disabled. This maintains stable data in width register 238 until the program has time to read the width data and process such. A "Character Ready" signal is sent to the main data buss when the first read (3 FEQ pulses) has been accomplished. Width data from register 238 is outputted through enable gate 240 in response to an input command received from the CPU.

The energization of the flash power supply to project a selected character from the character disc onto the photosensitive film is accomplished in the following manner. The O5D5 command from the CPU program is passed to flash control circuit 222 by gate 242 only when the eight bit of character data and register 220 is logical low. This "flash command" sets up flash control circuit 222, such that when the other input requirements are met, a flash will occur. These requirements include the input of the character equality signal (CHEQ), indicative of a comparison by character comparator 218. In addition, it is essential that the lens carriages be stable to ensure a quality image on the photosensitive film. This condition is indicated by a carriage ready (CARRDY) signal to the flash control circuit. In addition, the flash must be initiated at precisely at the leading edge of the flash window on the character disc. This condition is indicated by the strobe track input to the control circuit from the timing track on the character disc.

The flash control circuitry includes a delay counter which sends a disable (DISA) signal to width control circuits 236 if two consecutive flash commands are required. This allows time for the flash power supply capacitor to recharge for the second flash.

STEPPER ESCAPEMENT BOARD

Referring now to FIG. 9, the operation and functions of the Stepper Escapement Board may be more fully understood. This board may be divided into five basic operational groups, namely:

(1) Clock Interface
(2) Carriage Operation Sequence Control Logic
(3) Frequency Stepping Control
(4) Carriage Motor Sequencer
(5) Lens Constant Switches and Input/Output Control Logic The first four operational groups are related to movement of the escapement carriage, while the last group deals with carriage status and optical constants.

The clock interface, indicated by the numeral 246, comprises a clock, preferably a 16 KHZ oscillator, and a frequency divider which converts the 16 KHZ clock into two phase-related output frequencies of 2 KHZ and 1 KHZ respectively. These provide the basis for stepping and settling relays hereinafter described.

The carriage operation sequence control, generally indicated by the numeral 248, controls the sequence of events from the initial call for steps until the last step has been taken and the settling delay has been completed. It includes a Forward-Reverse control 250 which decodes data (D8) and provides an output in the form of direction control data which is fed to a motor sequencer 252. The Forward-Reverse control also inhibits operation of the motor sequencer by providing an inhibit signal to carriage gates 254 in the event either the right or left limit switch 256 is closed. This prevents the escapement motor from overdriving into the right or left limits of travel.

Sequence Control 248 is also provided with a start control 258 which "Initializes" the sequence when a O5B1 command is received. In response to this command, the start control releases the inhibit signal to a step/delay control 260, thereby setting the system into a stepping mode. At the same time a sync-control 262 is enabled to allow synchronized 1 KHZ pulses to be outputted to gate 254. These pulses are also used by the stepping control 264, which generate a "Last Step" signal when the total number of steps called for has been outputted. The number of steps called for is determined by the data received by the stepping control from internal data line 266. THe "Last Step" signal causes the Step-Delay Control 260 to generate a "Delay Mode Start" signal which terminates the step pulses to stepping control 264. When the delay time interval has been completed, the stepping control 264 sends a "Delay Complete" signal to start control 258, which resets the logic and waits for receipt of the next step data. At this time, a "Ready" signal is generated by start control 258.

Stepping control 264 may be divided into two main sections, *264a* and *264b*. Section *264a* is capable of accepting eight bits of input data and does so when a command is received to "Stop Stepping" or "Initialize". The eight bit data which is input into section 264 are low order carriage steps, with a total number of possible steps being 255.

Section *264b* of the stepping control is capable of accepting 7 bits of data when a "Start Stopping" (O5DI) command signal is received. These 7 bits are the high order carriage steps. The stepping control as a whole is capable of containing a total of 32,767 steps. In operation, the eighth bits of low order data are first loaded upon receipt of a "Stop Stepping" or "Initialize" command. The 7 bits of high order data are then loaded when the "Start Stepping" command is received. This command begins the stepping sequence under the control of the sync-control 264. The stepping control counts the input pulses, with each pulse decreasing the total count of steps by 1. When the count reaches 0, the "Last Step" pulse is generated, causing the step delay control to inhibit further pulses from being transferred and changes the delay mode. This enables a 1 KHZ pulse train to be passed by gate 268 to the "up" count of the stepping control. When the "Delay Complete" pulse occurs, it places the logic in a waiting mode and also causes the generation of a "Carriage Ready" (CARRDY).

The stepper escapement board is also provided with a lens constant switches 270 and associated multiplexers 272 which provide 16 bits of data to Input/Output logic 274 to provide predetermined optical constant necessary for proper operation of the variator and collimator lenses. The input/output control logic also serves to supply carriage limit, carriage ready, and film out information to the data bus. These signals are buffered through a data bus buffer 276.

The 1 KHZ pulses are gated at 254 with a 2 KHZ signal, whereby the output of the gate is a signal of 1 KHZ with a positive pulse width of a 2 KHZ square wave. This signal serves as a clock for a Gray Code Generator through motor sequences 252. The sequence of the Gray Code output is determined by the Direction Control signal from the Forward/Reverse control 250.

STEPPER BOARD

With reference to FIGS. *10a*, *10b*, and *10c*, the functions of the Stepper Board may be more fully understood. Basically, the Stepper Board contains circuitry to provide control required for font row selection, character size and leading. Timing for all the circuitry and delay constants is provided by a clock interface circuit 278, illustrated in FIG. *10b*, which converts a 16 KHZ input signal into a number of phase-related frequencies. Selection of font positions on the character disc is accomplished by utilizing input from the row shift detector and the row shift control illustrated in FIG. *10a*. Also, the character disc speed is determined by a font speed control circuit which utilizes a differentiated signal. The selected image size is obtained by proper positioning of the collimator and variator lenses which are controlled in part by circuitry contained on the stepper board. Similarly, leading of the photosensitive film or paper is controlled by the leading motor through circuit on this board.

Figure 10A:
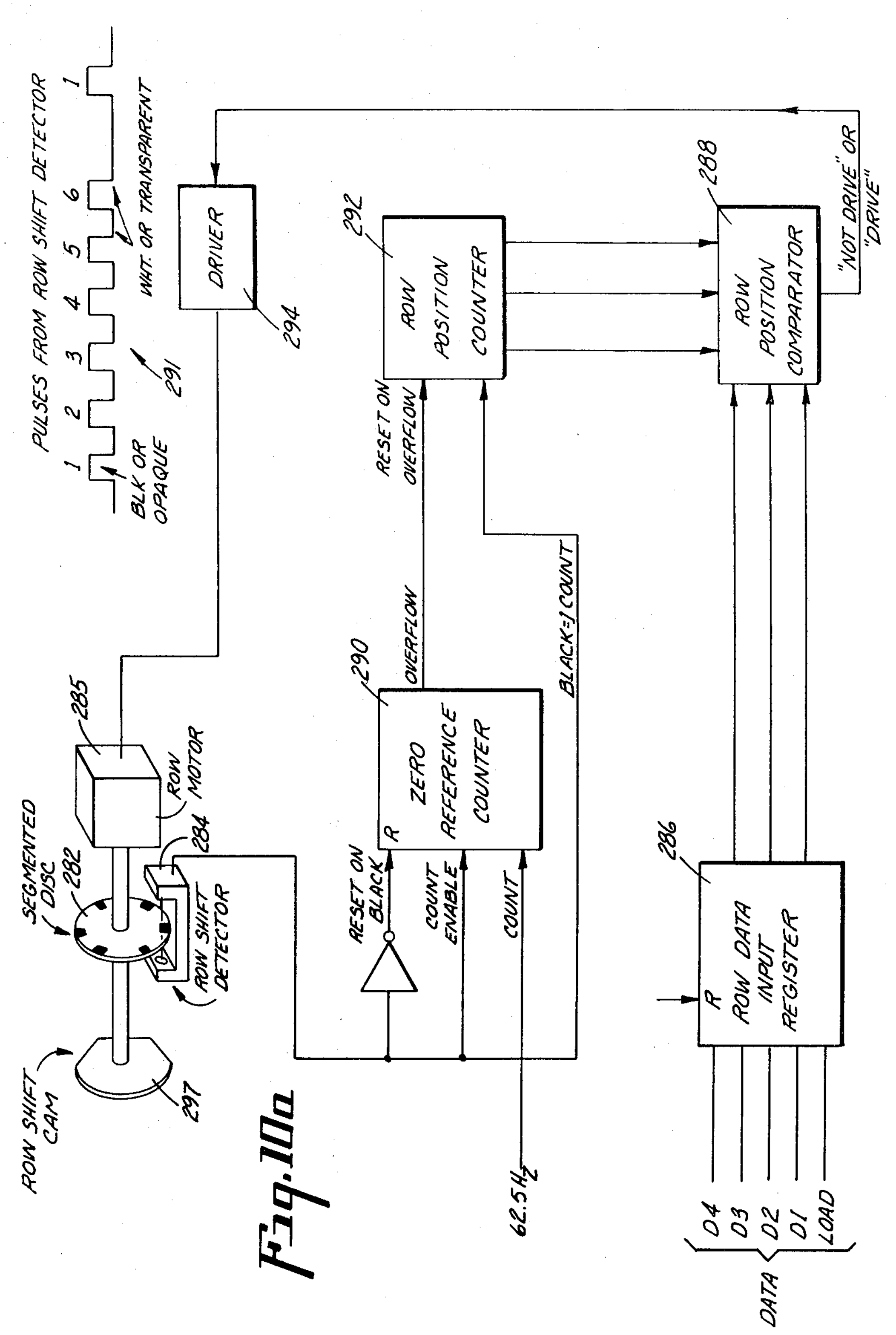

With particular reference to FIG. 10*a*, it will be appreciated that the row shift control includes a detector disc 280 having a plurality of opaque segments 282 spaced around its circumference. An appropriate photosensor unit 284 is mounted in operative relationship with the segmented disc and provided a beam of light which is tranmitted by the clear positions of the disc located between the opaque segments 282. The segmented disc is rotatably driven through appropriate connection to a row select motor 74, such that the light beam associated of photosensor 284 is periodically interrupted by the opaque segments. Each light interruption by the presence of an opaque segment is indicative of a font detent position of the character disc. Whenever light is permitted to pass through the clear area of the disc, such indicates that the character disc is not in a font detent position at that moment. A row data input register 286 is provided which receives row select information in the form of data bits. This data is stored in the register upon receipt of a "Load" command. This data is fed in parallel to a row position comparator 288.

A zero reference counter 290 is provided with two inputs associated with photosensor 284. A reset signal is provided to the counter 290 upon detection of an opaque segment, causing the counter logic to be reset. A "Count Enable" signal is provided when a clear or transparent area of the disc is detected by the photosensor. This enables the counter to count the square wave input, preferably of 62.5 HZ. The transparent area between the opaque segments corresponding to the first and last font positions is larger in arcuate distance than the transparent areas separating the other opaque segments. Thus, additional input pulses are counted by counter 290 when the larger transparent area is detected by the photosensor. This is indicated by the pulse pattern generally indicated by the numeral 291. The counter capacity is such that it is exceeded during passage of this area of the disc, and the counter overflow serves as a reset signal to a row position counter 292. The capacity of counter 290 is such that this count will not be exceeded when the detector senses the smaller transparent areas separating opaque segment of the disc. The reset on the overflow signal serves an an indication of a reference or starting position of the disc.

Each time an opaque segment is detected by sensor 284, a count pulse is input into row position counter 292, whereby the output is indicative of the current font position. When the data indicative of the current font position compares with that input from register 286, the row shift selector is in the desired position and a "Not Drive" signal is outputted to motor driver 294. This, in turn, stops row motor 74.

Selected fonts are provided from the character disc by radially shifting with respect to the flash power supply. This shifting is carried out by appropriate mechanism which includes, among other things, a row shift cam, illustrated at 297. This cam is driven in synchronism with the segmented disc, and such, each opaque segment on the disc corresponds to a "Drive" signal which allows motor 74 to continue rotating until the disc and cam reach the desired angular position, at which time a comparison will occur and a "Not Drive" signal outputted.

Figure 10B:
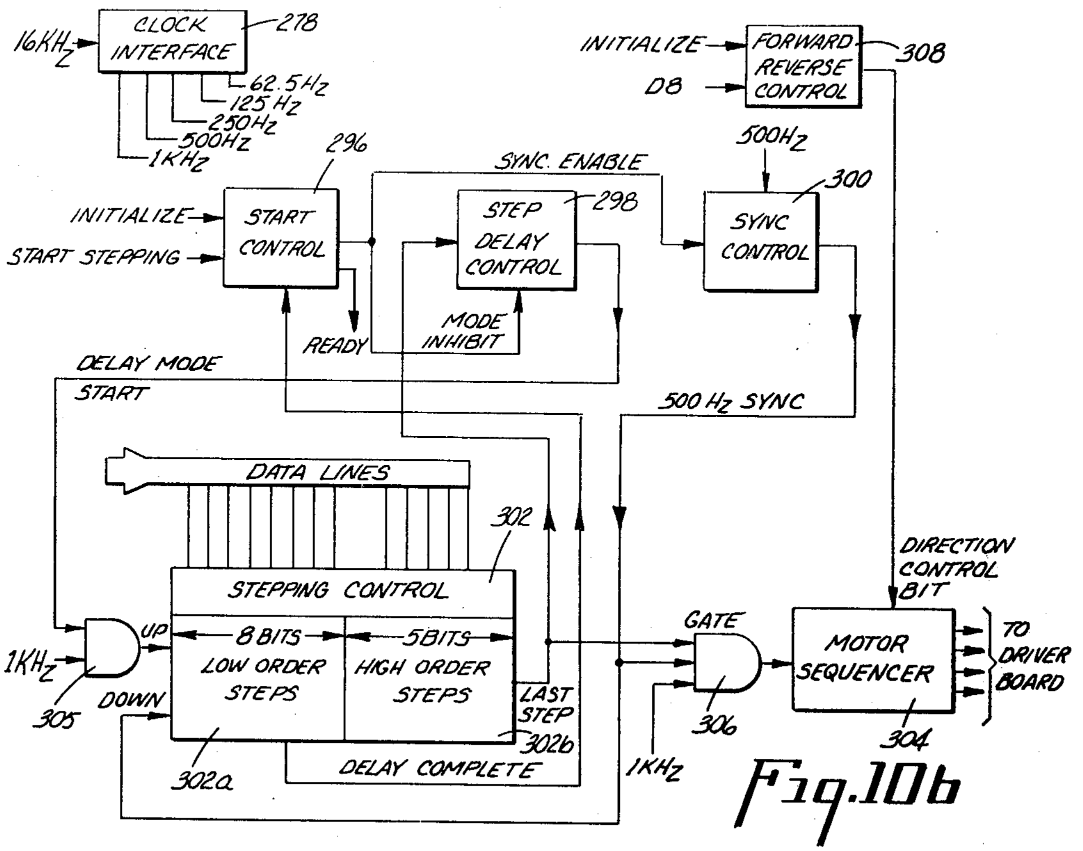

Referring now, more particularly, to FIG. 10*b*, operation of the variator lens control circuitry may be more fully understood. At this point, it should be noted that the collimator lens control circuit is identical to that for the variator lens, with the exception that the stepping control for the collimator lens includes single order stepping within the stepping control. Basically, both the variator and collimator lens control circuitry control the sequence of events from the initial call for steps of the lens carriage until the last step has been taken and the settling delay has been completed.

A start control 296 initializes the sequence when an "Initialize" command is received. When a "Start Stepping" command is received by control 296, it releases the inhibit signal to Step/Release control 298 and at the same time enables Sync Control 300 to provide sync pulses, preferably of 500 HZ. These pulses are utilized by stepping control 302 and motor sequencer 304 to begin movement of the variator lens. When the total number of steps have been outputted from the stepper control 302, a "Last Step" signal is provided to the step/relay control 298 to start the delay mode. This signal terminates step pulses to the stepping control and now directs delay pulses until the delay time has been completed. The stepping control then sends a "Delay Complete" signal to start control 296 which resets the logic. At this time a "Ready" signal is made available by the start control to the data bus. It will be appreciated that once the sequence is set and the variator (or collimator) lens is moving, the receipt of a subsequent "Initialized" command will terminate the sequence to the start control 296. This stops the variator lens and start control 296 will generate a Ready signal, whereby the control is placed in a mode waiting for new data.

Stepping control 302 includes two groups of control counters 302*a* an 302*b*, respectively. Group 302*a* is capable of inputting eight bits of data when "Initialize" command is received. These eight bits being of low order. Group 302*b* receives five bits of data when a "Start Stepping" command is received, with these five bits being of high order. This high and low order stopping control arrangement is similar to that described above with respect to the Stepper Escapement and a further description is felt to be unnecessary.

It will be appreciated that when a "Start Stepping" command is received, it enables sync control 300 to input pulses to the "Down" counting input stepping control 302. The "Last Step" pulse inhibits gate 306, whereby further pulses are not transferred to motor sequencer 304. It also changes the sequence of the delay mode, thereby enabling a 1 KHZ pulse train to be passed through gate 305 to the "Up" count input of the stepping control. When the value of 32 is reached, a "Delay Complete" pulse is generated by the stepping control to the start control 296, whereby the sequencer is completed and the logic is returned to a Wait state.

Gate 306 receives the 500 HZ sync pulses, together with a 1 KHZ signal, whereby the output of the gate is a signal of 500 HZ, with a positive pulse width of a 1 KHZ square wave. This signal serves as a clock for a Gray Code Generator through motor sequencer 304. A forward/reverse control 308 provides direction signals to sequencer 304 which determines the sequence of the Gray Code Output. The Gray Code associated with sequencer 304 converts each input pulse from gate 306 into one motor step of the proper sequence (forward or reverse). These input pulses may be terminated in two ways:

(1) By completing the total number of steps to be taken ("last step" pulse), or (2) By receipt of an "Initialize" low order command.

It will be appreciated that the Stepper Board is also provided with appropriate Input/Output control logic for furnishing information to the data bus. This information would include data defining the conditions of the variator and collimator home switches, plus the status of the variator, collimator and leading motors.

Figure 10C:
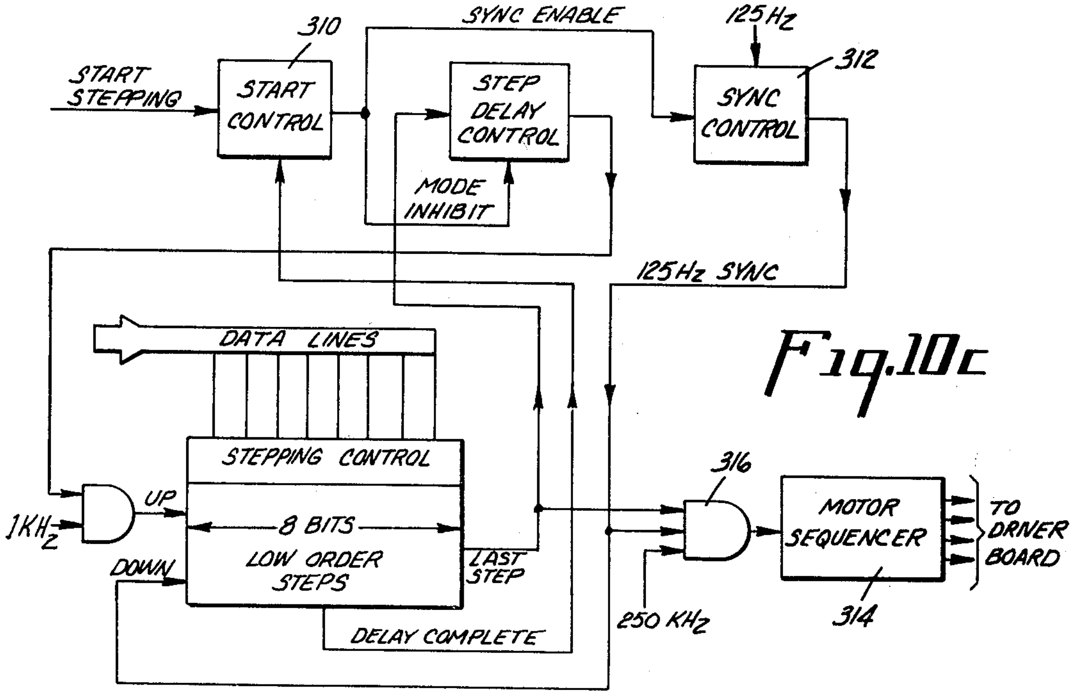

The stepper board also contains Leading Control circuitry which is illustrated in FIG. 10c. Operation of the leading control is basically the same as that of the variator/collimator control circuit, described above. The major difference is that the entire operation is based on a single "Start Stepping" instruction to a start control, which is indicated at 310. In addition, the sync-control, which is indicated at 312, provides 125 HZ sync-pulses rather then 500 HZ. This sync pulse is inputted to a motor sequencer 314 together with a 250 KHZ signal through gate 316. It will also be appreciated that the stepping controls differ in that it contains a low order section only. This section is capable of inputting 8 bits of data when a "start stepping" command is received. The counter acts in the same manner as the low order stepping control counter associated with the variator/collimator control. The operation of the leading motor sequencer 314 is identical to the above-described motor sequence, except that the direction of stepping is fixed, thus eliminating the requirement for a forward/reverse control. Of course, it will be appreciated that if a "reverse leading" type function is contemplated with the photocomposition machine, an appropriate reverse/forward ontrol, such as that disclosed with the variator/collimator lens control circuit, may be added.

VARIATOR/COLLIMATOR ROUTINE

As mentioned above, the positions of the variator and collimator lens carriages are a function of the selected point size. Each command and associated point size value is entered into the display portion of the RAM. The CPU program is continuously looking at the data in the RAM, such that the presence of a point size command is recognized and the variator/collimator routine is initiated. This routine provides lens position control information in the form of step data to the variator and collimator stepper controls.

FIG. 11 is a simplified flow chart of the variator/collimator lens position routine. The CPU is provided with a look-up table in ROM for converting the keyboard code to CPU code. As the CPU looks at the data stored in the RAM it continuously compares the codes, as indicated diagrammatic by block 318. Upon recognition of a point size command, as indicated by block 320, the program will proceed with the routine. On the other hand, if there is no point size command present in the RAM, the program will perform various other functions.

When a point size command is recognized, the point size value associated with the command is read from the display memory. This operation is indicated by block 322. Since this point size value is in keyboard code, such is converted into CPU code via a ROM look-up table indicated functionally at 324. The program further checks to see if the point size value is a "Valid Size", as it is possible that the operator may accidently enter numbers which do not fall within the range of point size values, in which event, the routine is terminated by a decision indicated by block 326. If the point size value is "Valid", such is used to address another ROM look-up table, which provides the "New" variator position data. This is indicated by blocks 328 and 330.

The current position of the variator lens is stored in a register, or the like, associated with the CPU. This data is described as the "Previous" select lens position data as it corresponds to the previously desired position. The position data corresponding to the newly desired position is referred to as the "New" position data. The program determines the difference between the "New" and "Previous" position data and the direction in which the variator lens carriage must be moved. This operation is indicated diagrammatically by block 332.

The "Difference Data" is used by the program to provide signals to the variator stepper control, whereby the variator carriages are stepped in accordance with the above description. The "new" variator position data is loaded into a CPU register, as indicated by block 336, to provide the "Previous" position data when the program executes the next routine in response to detection of a new point size command in the display memory.

After providing the output to the variator stepper control, the above routine proceeds in a similar manner to provide position control signals for the collimator lens. The point size code is used to address a look-up table in the CPU ROM to provide "New" collimator position data, as indicated by blocks 338 and 340. The "Previous" position data for the collimator lens carriage is stored in an appropriate register, of the like, of the CPU. Program determines the difference between the "New" position data and the "Previous" position data to provide "Difference Data" (block 342), which is outputted to the collimator stepper control, as indicated by block 344. The "New" collimator position data is then loaded into the register provided for the "Previous" collimator position as indicated by block 346. The program then refers back to the RAM to repeat the routine or perform other functions in response to commands recognized in the memory.

It will be appreciated that the routine may be modified slightly to provide control of a lens system employing lens other then the variator and collimator lenses disclosed. For example, a zoom lens system may be employed to provide the desired amplification, with the control program changing the relative positions or conditions of the zoom lenses.

It is not intended that the present invention be limited to the specific embodiment disclosed in the above description and associated drawings. Numerous modifications and adaptations of the invention will be apparent to those skilled in the art. Thus, it is intended by the following claims to cover all such modifications and adaptations falling within the true spirit and scope of the invention.

What is claimed is:

1. In a photocomposition machine comprising: font means for providing at least one font of a plurality of characters; projection light source means for successively illuminating preselected characters of said font means so that the characters are projected along an optical axis and onto a print plane; a photosensitive receiving sheet located in the print plane; input means for generating point size data representative of the point size of a character selected by an operator for photocomposition from a plurality of available point sizes; variator lens means for successively forming a plurality of aerial images representing a plurality of degrees of magnification of said preselected characters by movement of said variator lens means parallel to the optical axis into a plurality of different positions determined by the point size data; collimator lens means movable parallel to the optical axis into a plurality of different composing positions determined by the point size data in which the aerial image forms an object image for the collimator lens means so that collimated light rays are formed; decollimator lens means responsive to the collimated light rays for focusing a print image corresponding to the aerial image on the receiving sheet, a method for accurately focusing characters at the selected point size onto the receiving sheet comprising the steps of:

- defining a first reference position and a second reference position;
- driving the variator lens means to the first reference position in a predetermined direction;
- driving the collimator lens means to the second reference position in a predetermined direction;
- driving the variator lens means from the first reference position to a first one of said composing positions determined by said point size data only in a direction opposite the predetermined direction in which the variator lens means is driven to the first reference position; and
- driving the collimator lens means from the second reference position to a second one of said composing positions determined by said point size data only in a direction opposite the predetermined direction in which the collimator lens means is driven to the second reference position.

2. The method according to claim 1 in which the variator lens means and the collimator lens means are driven to the first and second reference positions each time operation of the photocomposition machine is initiated.

3. The method of claim 2 further comprising the steps of: defining a third reference position; and driving the decollimator lens means to the third reference position each time operation of the photocomposition machine is initiated.

4. The method according to claim 1, wherein the variator lens means comprises a magnifying lens and first carriage means for moving the magnifying lens along the optical axis through a first path having end points, wherein the collimator lens means comprises a collimating lens and second carriage means for moving the collimating lens along the optical axis through a second path having end points, wherein the first reference point is defined at an end point of the first path and wherein the second reference position is defined at an end point of the second path.

5. The method according to claim 4 wherein the decollimator lens means comprises a decollimating lens and third carriage means for moving the decollimating lens along the optical axis through a third path having end points and wherein the third reference position is defined at an end point of the third path.

* * * * *